(12) United States Patent  (10) Patent No.: US 12,555,314 B2
Lin  (45) Date of Patent: Feb. 17, 2026

(54) THREE-DIMENSIONAL SHADING METHOD, APPARATUS, AND COMPUTING DEVICE, AND STORAGE MEDIUM

(71) Applicant: HUAWEI TECHNOLOGIES CO., LTD., Guangdong (CN)

(72) Inventor: Tengyi Lin, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 227 days.

(21) Appl. No.: 18/172,353

(22) Filed: Feb. 22, 2023

(65) Prior Publication Data

US 2023/0196666 A1    Jun. 22, 2023

Related U.S. Application Data

(63) Continuation of application No. PCT/CN2021/102806, filed on Jun. 28, 2021.

(30) Foreign Application Priority Data

Aug. 31, 2020  (CN) .......................... 202010896298.4
Jun. 10, 2021  (CN) .......................... 202110649436.3

(51) Int. Cl.
*G06T 15/80* (2011.01)
*G06T 15/06* (2011.01)
(Continued)

(52) U.S. Cl.
CPC ............ *G06T 15/506* (2013.01); *G06T 15/06* (2013.01); *G06T 15/20* (2013.01); *G06T 15/80* (2013.01)

(58) Field of Classification Search
CPC ....... G06T 15/80; G06T 15/20; G06T 15/506; G06T 15/55; G06T 15/50; G06T 15/06; G06T 15/04
See application file for complete search history.

(56) References Cited

U.S. PATENT DOCUMENTS 11,900,532 B2 * 2/2024 Harviainen ........... G06F 16/583
2004/0155879 A1 8/2004 Mittring
(Continued)

FOREIGN PATENT DOCUMENTS

CN    103035027 A    4/2013
CN    104008563 A    8/2014
CN    106846447 A    6/2017

OTHER PUBLICATIONS

Yining Zhu et al:"PERIS: A programming environment for realistic image synthesis", Jan. 1, 1988 (Jan. 1, 1988), P026773471, total 9 pages.
(Continued)

*Primary Examiner* — King Y Poon
*Assistant Examiner* — Vincent Peren
(74) *Attorney, Agent, or Firm* — Fish & Richardson P.C.

(57) ABSTRACT

In a three-dimensional shading method, a computing device obtains position information and intensity of at a light source in a target space. The computing device determines, based on the position information and the intensity of the light source, illumination information corresponding to each surface of a three-dimensional object in the target space under illumination of the light source. For each surface, the illumination information corresponding to the surface includes one or more layers of illumination information that reflect illumination information of each position point on the surface under illumination of the light source. The computing device then provides the illumination information of the multiple surfaces of the three-dimensional object to a device that performs shading processing on the target space.

15 Claims, 8 Drawing Sheets

(51) Int. Cl.
   *G06T 15/20*   (2011.01)
   *G06T 15/50*   (2011.01)

(56) References Cited

U.S. PATENT DOCUMENTS

| | | | |
|---|---|---|---|
| 2005/0248571 A1 | 11/2005 | McTaggart | |
| 2014/0285499 A1* | 9/2014 | Iwasaki | G09G 5/363 345/502 |
| 2014/0327690 A1* | 11/2014 | McGuire | G06T 15/005 345/589 |
| 2014/0375659 A1* | 12/2014 | Mcguire | G06T 15/506 345/520 |
| 2017/0116773 A1* | 4/2017 | Iwaniec | G06T 15/06 |
| 2017/0263043 A1* | 9/2017 | Peterson | G06T 15/06 |
| 2022/0138988 A1* | 5/2022 | Stengel | G06T 9/00 345/426 |

OTHER PUBLICATIONS

Wang Beibei et al:"Precomputed Multiple Scattering for Rapid Light Simulation in Participating Media", HAL open science, Jul. 1, 2020 (Jul. 1, 2020), pp. 1-15, XP093120829.

* cited by examiner

THREE-DIMENSIONAL SHADING METHOD, APPARATUS, AND COMPUTING DEVICE, AND STORAGE MEDIUM

CROSS-REFERENCE TO RELATED APPLICATIONS

This application is a continuation of International Application No. PCT/CN2021/102806, filed on Jun. 28, 2021, which claims priority to Chinese Patent Application No. 202010896298.4, filed on Aug. 31, 2020, which claims priority to Chinese Patent Application No. 202110649436.3, filed on Jun. 10, 2021. All of the aforementioned priority applications are hereby incorporated by reference in their entirety.

TECHNICAL FIELD

This application relates to the field of image rendering, and in particular, to a three-dimensional shading method, apparatus, and computing device, and a storage medium.

BACKGROUND

Currently, a three-dimensional object is included in many scenarios. The three-dimensional object includes a grid formed by geometry, and the geometry is an element formed by a polygon in a three-dimensional model, for example, a point, a line, a triangle, or a polygon. For example, a plurality of triangles form a three-dimensional object. When shading processing is performed on the three-dimensional object in a process of rendering the three-dimensional object in three-dimensional space, a ray tracing method is usually used during the shading processing. Specifically, when the ray tracing method is used, a shading device tracks, by using a set position of a light source, a quantity of light rays of the light source, and a light direction, a light ray emitted from eyes, and shades the three-dimensional object. Subsequently, the three-dimensional object may be displayed based on a shading result.

When the ray tracing method is used, because the light ray emitted from the eyes is tracked, when re-shading is caused by a change of an observer position or a viewing angle of an observer, light casting in a shading process needs to be recalculated. As a result, the amount of calculation is large.

SUMMARY

This application provides a three-dimensional shading method, apparatus, and computing device, and a storage medium, to reduce a calculation amount of a shading device.

According to a first aspect, this application provides a three-dimensional shading method, where the method includes: obtaining position information and an intensity of at least one light source in target space; determining, based on the position information and the intensity of the at least one light source, at least one group of illumination information corresponding to each surface of a three-dimensional object in the target space under illumination of the at least one light source, where for any surface, a first group of illumination information corresponding to the surface includes one or more layers of illumination information, and the one or more layers of illumination information reflect illumination information of each position point on the surface under illumination of a light source to which the first group of illumination information belongs; and providing the at least one group of illumination information for a device that performs shading processing on the target space.

In the solution shown in this application, the method may be performed by a server. The server may obtain the position information and the intensity of the at least one light source that are set by a person skilled in the art when drawing the target space. The position information of the light source is used to indicate a position of the light source in the target space. The intensity of the light source may be represented by using a color of the light source, or may be represented by using A watts per square meter, where A is a value of the intensity of the light source. For each light source, the server may determine, based on the position information and the intensity of the light source and position information of each three-dimensional object in the target space, a group of illumination information corresponding to each surface of each three-dimensional object in the target space under illumination of the light source, that is, obtain a group of illumination information corresponding to each surface of the three-dimensional object in the target space under illumination of the light source, where the group of illumination information includes the one or more layers of illumination information. The server may determine devices that perform shading processing on the target space, and send the at least one group of illumination information in the target space to these devices.

In this way, for target space, the server may calculate illumination information once, and provide the illumination information for the device (subsequently referred to as a shading device) that performs shading processing on the target space. Therefore, the shading device may perform shading processing on the target space based on a viewing angle and an observer position determined by the shading device and the illumination information provided by the server. In this way, even if the shading device obtains that the viewing angle and/or the observer position change/changes, the illumination information does not need to be re-determined. Therefore, a processing resource of the shading device can be saved.

In a possible implementation, the method further includes: obtaining light ray information of the light source, where the light ray information includes a quantity of light rays and a light direction; and the determining, based on the position information and the intensity of the at least one light source, at least one group of illumination information corresponding to each surface of a three-dimensional object in the target space under illumination of the at least one light source includes: determining scattering information of each surface of the three-dimensional object in the target space with a light ray of the at least one light source based on the intensity, the position information, and the light ray information of the at least one light source; and determining, based on the scattering information of each surface of the three-dimensional object, the at least one group of illumination information corresponding to each surface of the three-dimensional object under illumination of the at least one light source.

For a first surface of the three-dimensional object under illumination of any one light source, scattering information of the first surface includes an intensity, a direction, and a number of bounces of an incident light ray at each position point on the first surface, or includes an intensity, a direction, and a number of bounces of a reflection light ray at each position point on the first surface.

In the solution shown in this application, the server may obtain light ray information of a light source, where the light ray information of the light source may include a quantity of light rays and a light direction of the light source, the quantity of light rays is a quantity of light rays emitted by the light source, and the light direction is an angle at which each light ray is emitted from the light source. The server respectively determines a group of illumination information corresponding to each surface of a three-dimensional object under illumination of each light source. Specifically, for any one light source, the server may determine scattering information of each surface of each three-dimensional object in target space with a light ray of the light source based on the intensity of the light source, position information of the light source, the light ray information of the light source, and the position information of the three-dimensional object in space. When determining the scattering information, the server determines the scattering information by using a ray casting algorithm in ray tracing. Then, the server may determine, by using the scattering information of each surface of each three-dimensional object, at least one group of illumination information corresponding to each surface of each three-dimensional object under illumination of at least one light source. In this way, the corresponding at least one group of illumination information under illumination of the at least one illumination may be determined based on the scattering information.

In a possible implementation, the determining, based on the scattering information of each surface of the three-dimensional object, the at least one group of illumination information corresponding to each surface of the three-dimensional object under illumination of the at least one light source includes: separately superposing, for a first surface of the three-dimensional object in the target space, intensities and directions of light rays that have a same number of bounces and that are in scattering information corresponding to the first surface under illumination of a target light source in the at least one light source, to obtain a superposition intensity and a superposition direction of rays of each number of bounces and corresponding to the first surface; and determining, based on the superposition intensity and the superposition direction of the rays of each number of bounces, a group of illumination information corresponding to the first surface under illumination of the target light source.

In the solution shown in this application, under illumination of the target light source, the scattering information corresponding to the first surface includes an intensity, a direction, and a source of an incident light ray at each position point on the first surface, and the source records a number of bounces when the light ray is bounced on the first surface after being emitted from the light source. The server may superpose directions of incident light rays having a same number of bounces at each position point on the first surface, to obtain a direction of the incident light ray at each position point, and superpose intensities of the incident light rays having the same number of bounces at each position point, to obtain a superposition intensity of the incident light ray at each position point. For the first surface, the server determines the superposition intensity and the superposition direction of the incident light ray having each number of bounces as a group of illumination information of the first surface under illumination of the target light source. In the group of illumination information, each layer of illumination information is the superposition intensity and the superposition direction of the incident light ray having each number of bounces. Alternatively, under illumination of the target light source, the scattering information corresponding to the first surface includes an intensity, a direction, and a source of a reflection light ray at each position point on the first surface, and the source records a number of bounces when the light ray is bounced on the first surface after being emitted from the light source. The server may superpose directions of reflection light rays having a same number of bounces at each position point on the first surface, to obtain a superposition direction of the reflection light ray at each position point, and superpose intensities of the reflection light rays having the same number of bounces at each position point, to obtain a superposition intensity of the reflection light ray at each position point. For the first surface, the server determines the superposition intensity and the superposition direction of the reflection light ray having each number of bounces as a group of illumination information of the first surface under illumination of the target light source. In the group of illumination information, each layer of illumination information is the superposition intensity and the superposition direction of the reflection light ray having each number of bounces. In this way, illumination information of each surface can be accurately determined by light casting.

In a possible implementation, an intensity and a direction of a light ray in the scattering information corresponding to the first surface under illumination of the target light source are respectively an incident intensity and an incident direction of a light ray incident to the first surface; or an intensity and a direction of a light ray in the scattering information corresponding to the first surface under illumination of the target light source are respectively a reflection intensity and a reflection direction of a light ray reflected from the first surface.

In a possible implementation, the determining, based on the scattering information of each surface of the three-dimensional object, the at least one group of illumination information corresponding to each surface of the three-dimensional object under illumination of the at least one light source includes: for a first surface of the three-dimensional object, determining, in scattering information corresponding to the first surface under illumination of a target light source, an intensity and a direction of a light ray that belongs to each incident range and that is in light rays incident to each position point; and determining, based on a superposition intensity and a superposition direction of the light ray that is in each incident range and that corresponds to each position point, a group of illumination information corresponding to the first surface under illumination of the target light source; or for a first surface of the three-dimensional object, determining, in scattering information corresponding to the first surface under illumination of a target light source, an intensity and a direction of a light ray that belongs to each reflection range and that is in light rays emitted from each position point; and determining, based on a superposition intensity and the superposition direction of the light ray that is in each reflection range and that corresponds to each position point, a group of illumination information corresponding to the first surface under illumination of the target light source.

In the solution shown in this application, each light source is divided into a plurality of incident ranges based on an incident angle, and division of the incident ranges may be set based on an actual requirement. For a target position point on the first surface of the three-dimensional object, the target position point is any position point on the first surface. In scattering information corresponding to the first surface under illumination of the target light source, an intensity and a direction of a light ray that belongs to each incident range and that is in light rays incident to the target position point are determined based on an incident angle in the incident range. For a first incident range in the incident ranges, intensities of light rays that belong to the first incident range are superposed to obtain a superposition intensity of a light ray at the target position point, and directions of the light rays that belong to the first incident range are superposed to obtain a superposition direction of the light ray at the target position point. In this manner, the superposition intensity and the superposition direction of the light ray at each position point on the first surface in each incident range are obtained.

Alternatively, each light source is divided into a plurality of reflection ranges based on a reflection angle, and division of the reflection ranges may be set based on an actual requirement. For a target position point on the first surface of the three-dimensional object, in scattering information corresponding to the first surface under illumination of the target light source, an intensity and a direction of a light ray that belongs to each reflection range and that is in light rays emitted from the target position point are determined based on a reflection angle in the reflection range. For a first reflection range in the reflection ranges, intensities of light rays that belong to the first reflection range are superposed to obtain a superposition intensity of a light ray at the target position point, and directions of the light rays that belong to the first reflection range are superposed to obtain a superposition direction of the light ray at the target position point. In this manner, the superposition intensity and the superposition direction of the light ray at each position point on the first surface in each reflection range are obtained.

In this way, illumination information can be more flexible through division of an angle range.

According to a second aspect, this application provides a three-dimensional shading method, where the method includes: obtaining at least one group of illumination information corresponding to each surface of a three-dimensional object in target space under illumination of at least one light source, where for any surface, a first group of illumination information corresponding to the surface includes one or more layers of illumination information, and the one or more layers of illumination information reflect illumination information of each position point on the surface under illumination of a light source to which the first group of illumination information belongs; obtaining an observer position and a viewing angle of an observer; and performing, in screen space, shading processing on the three-dimensional object in the target space based on illumination information corresponding to each surface of the three-dimensional object in the target space under illumination of a current light source, the observer position, and the viewing angle.

In the solution shown in this application, the method may be performed by a shading device, and the screen space is two-dimensional space, and is coordinate space of a 2D image generated during 3D rendering. The shading device may receive at least one group of illumination information that corresponds to each surface of each three-dimensional object in the target space under illumination of the at least one light source and that is sent by a server, and then store the at least one group of illumination information. Alternatively, the shading device determines at least one group of illumination information corresponding to each surface of each three-dimensional object in the target space under illumination of the at least one light source, and stores the at least one group of illumination information. In different scenarios, the shading device obtains the observer position of the observer in different manners. For example, in a game scenario, an initial position is preset. An observer (that is, a game player) controls a player by using a game lever to move in target space. The shading device determines movement information of a current game lever relative to the initial position, and determines a position of a current player, that is, obtains the observer position of the observer. The observer position is a position of the observer in a world coordinate system. The shading device may detect a line-of-sight direction of eyes, to obtain a viewing angle of the observer. Then, the shading device may determine the current light source in the target space. The shading device may perform shading processing on the three-dimensional object in the target space based on illumination information and material information of each surface of each three-dimensional object under illumination of the current light source, position information of each three-dimensional object, geometric information of each three-dimensional object, and a position coordinate of each three-dimensional object in an observer coordinate system, to obtain a total shading result of each surface of the three-dimensional object. In this way, because illumination information of each three-dimensional object in the target space can be obtained, even if the observer position and the viewing angle change, the shading device may directly re-perform shading processing on the target space based on the illumination information in the target space, and the illumination information does not need to be recalculated in a shading process. Therefore, a processing resource of the shading device can be saved.

In a possible implementation, the performing, in screen space, shading processing on the three-dimensional object in the target space based on illumination information corresponding to each surface of the three-dimensional object in the target space under illumination of a current light source, the observer position, and the viewing angle includes: if there are a plurality of the current light sources, separately performing, under illumination of any one light source of the current light sources, shading processing on each surface of the three-dimensional object based on illumination information corresponding to each surface of the three-dimensional object under illumination of the light source, the observer position, and the viewing angle, to obtain a shading result of each surface of the three-dimensional object in the screen space under illumination of the light source; and accumulating shading results of each surface of the three-dimensional object in the screen space under illumination of the current light sources, to obtain a total shading result of each surface of the three-dimensional object in the screen space.

In the solution shown in this application, the shading device may determine a shading result of each surface of the three-dimensional object under illumination of each current light source. Then, for any surface, the shading device may accumulate all shading results of the surface to obtain a total shading result of the surface. In this way, shading can also be implemented in the case of a plurality of light sources.

In a possible implementation, under illumination of any one light source of current light sources, the separately performing, under illumination of any one light source of the current light sources, shading processing on each surface of the three-dimensional object based on illumination information corresponding to each surface of the three-dimensional object under illumination of the light source, the observer position, and the viewing angle, to obtain a shading result of each surface of the three-dimensional object in the screen space under illumination of the light source includes: under illumination of any one light source of the current light sources, if a first surface of the three-dimensional object in the target space corresponds to one layer of illumination information, obtaining, based on the layer of illumination information corresponding to the first surface, the observer position, and the viewing angle, a shading result of the first surface in the screen space under illumination of the light source; or if the first surface of the three-dimensional object corresponds to a plurality of layers of illumination information, separately shading the first surface based on the plurality of layers of illumination information corresponding to the first surface, the observer position, and the viewing angle, to obtain shading results respectively generated by the plurality of layers of illumination information corresponding to the first surface under illumination of the light source; obtaining a shading result of the first surface in the screen space under illumination of the light source based on the shading results respectively generated by the plurality of layers of illumination information corresponding to the first surface; or performing accumulation processing on the plurality of layers of illumination information corresponding to the first surface to obtain accumulated illumination information corresponding to the first surface; and obtaining a shading result of the first surface in the screen space under illumination of the light source based on the accumulated illumination information corresponding to the first surface, the observer position, and the viewing angle.

In the solution shown in this application, if the first surface under illumination of any one light source only corresponds to one layer of illumination information, the shading device may directly determine a shading result of the first surface based on the layer of illumination information, an observer position, and a viewing angle.

If the first surface under illumination of any one light source corresponds to a plurality of layers of illumination information, the shading device may first determine a shading result of each layer of illumination information for the first surface, and then accumulate all shading results of the first surface to obtain a shading result of the first surface. Alternatively, the shading device may first determine a plurality of layers of illumination information for accumulation, to obtain accumulated illumination information. Then, a shading result of the first surface is determined based on the accumulated illumination information. In this way, a shading result of each surface of the three-dimensional object may be determined based on stored illumination information.

In a possible implementation, each layer of illumination information of the plurality of layers of illumination information included in the first group of illumination information corresponds to illumination information in different incident ranges or illumination information in different reflection ranges; and the performing, in screen space, shading processing on the three-dimensional object based on illumination information corresponding to each surface of the three-dimensional object under illumination of a current light source, the observer position, and the viewing angle includes: for a target position point on the first surface of the three-dimensional object, separately selecting, from a group of illumination information corresponding to the first surface under illumination of each current light source, at least one layer of illumination information closest to a viewing angle corresponding to the target position point; and performing shading processing on the target position point in the screen space based on the at least one layer of illumination information selected from each group of illumination information, the observer position, and the viewing angle corresponding to the target position point.

In the solution shown in this application, for the target position point on the first surface of the three-dimensional object, before shading is performed, a group of illumination information corresponding to the first surface under illumination of each current light source is obtained. In each group of illumination information, at least one layer of illumination information closest to the viewing angle corresponding to the target position point is selected. The shading device performs shading processing on the target position point by using the at least one layer of illumination information selected from each group of illumination information, the observer position, and the viewing angle corresponding to the target position point. In this way, illumination information can be dynamically selected, and the three-dimensional object can be dynamically rendered in real time.

In a possible implementation, the obtaining at least one group of illumination information corresponding to each surface of a three-dimensional object in target space under illumination of at least one light source includes: receiving the at least one group of illumination information that corresponds to each surface of the three-dimensional object in the target space under illumination of the at least one light source and that is sent by a server; or determining the at least one group of illumination information corresponding to each surface of the three-dimensional object in the target space under illumination of the at least one light source.

In the solution shown in this application, the shading device may receive illumination information from the server, and store the illumination information, or may determine illumination information, and store the illumination information.

According to a third aspect, this application provides a three-dimensional shading method, where the method is performed by a shading device, and the method includes:

obtaining at least one group of illumination information corresponding to each surface of a three-dimensional object in target space under illumination of at least one light source, where for any surface, a first group of illumination information corresponding to the surface includes one or more layers of illumination information, and the one or more layers of illumination information reflect illumination information of each position point on the surface under illumination of a light source to which the first group of illumination information belongs; determining, in the at least one group of illumination information, illumination information corresponding to each surface of the three-dimensional object under illumination of a current light source; and performing shading processing on the three-dimensional object in screen space based on the illumination information corresponding to each surface of the three-dimensional object under illumination of the current light source and a reflectivity of each surface.

In the solution shown in this application, the shading device may obtain at least one group of illumination information corresponding to each surface of each three-dimensional object in target space under illumination of at least one light source. For any surface of the three-dimensional object, a reflectivity of the surface is obtained. A value relationship between the reflectivity of the surface and a preset value is determined. If the reflectivity of the surface is less than the preset value, shading processing is performed on the surface in material space based on illumination information corresponding to the surface under illumination of a current light source, to obtain a material shading result. Then, secondary rendering is performed on the material shading result of the surface, and shading is performed in screen space. In this way, because illumination information does not need to be recalculated in a shading process, a processing resource of the shading device can be saved.

According to a fourth aspect, this application provides a three-dimensional shading apparatus. The apparatus includes a plurality of modules, and the plurality of modules implement, by executing instructions, the three-dimensional shading method provided in the first aspect.

According to a fifth aspect, this application provides a three-dimensional shading apparatus. The apparatus includes a plurality of modules, and the plurality of modules implement, by executing instructions, the three-dimensional shading method provided in the second aspect.

According to a sixth aspect, this application provides a three-dimensional shading apparatus. The apparatus includes a plurality of modules, and the plurality of modules implement, by executing instructions, the three-dimensional shading method provided in the third aspect.

According to a seventh aspect, this application provides a three-dimensional shading computing device. The computing device includes a processor and a memory. The memory stores computer instructions, and the processor executes the computer instructions to implement the method in the first aspect and the possible implementations of the first aspect.

According to an eighth aspect, this application provides a computer-readable storage medium. The computer-readable storage medium stores computer instructions, and when the computer instructions in the computer-readable storage medium are executed by a computing device, the computing device is enabled to perform the method in the first aspect and the possible implementations of the first aspect, or the computing device is enabled to implement a function of the apparatus in the fourth aspect and the possible implementations of the fourth aspect.

According to a ninth aspect, this application provides a computer program product including instructions, and when the computer program product runs on a computing device, the computing device is enabled to perform the method in the first aspect and the possible implementations of the first aspect, or the computing device is enabled to implement a function of the apparatus in the fourth aspect and the possible implementations of the fourth aspect.

According to a tenth aspect, this application provides a three-dimensional shading computing device. The computing device includes a processor and a memory. The memory stores computer instructions, and the processor executes the computer instructions to implement the method in the second aspect and the possible implementations of the second aspect.

According to an eleventh aspect, this application provides a computer-readable storage medium. The computer-readable storage medium stores computer instructions, and when the computer instructions in the computer-readable storage medium are executed by a computing device, the computing device is enabled to perform the method in the second aspect and the possible implementations of the second aspect, or the computing device is enabled to implement a function of the apparatus in the fifth aspect and the possible implementations of the fifth aspect.

According to a twelfth aspect, this application provides a computer program product including instructions, and when the computer program product runs on a computing device, the computing device is enabled to perform the method in the second aspect and the possible implementations of the second aspect, or the computing device is enabled to implement a function of the apparatus in the fifth aspect and the possible implementations of the fifth aspect.

According to a thirteenth aspect, this application provides a three-dimensional shading computing device. The computing device includes a processor and a memory. The memory stores computer instructions, and the processor executes the computer instructions to implement the method in the third aspect and the possible implementations of the third aspect.

According to a fourteenth aspect, this application provides a computer-readable storage medium. The computer-readable storage medium stores computer instructions, and when the computer instructions in the computer-readable storage medium are executed by a computing device, the computing device is enabled to perform the method in the third aspect and the possible implementations of the third aspect, or the computing device is enabled to implement a function of the apparatus in the sixth aspect and the possible implementations of the sixth aspect.

According to a fifteenth aspect, this application provides a computer program product including instructions, and when the computer program product runs on a computing device, the computing device is enabled to perform the method in the third aspect and the possible implementations of the third aspect, or the computing device is enabled to implement a function of the apparatus in the sixth aspect and the possible implementations of the sixth aspect.

According to a sixteenth aspect, this application provides a three-dimensional shading system. The system includes a server and a shading device. The server is configured to implement the method in the first aspect and the possible implementations of the first aspect, and the shading device is configured to implement the method in the second aspect and the possible implementations of the second aspect.

Beneficial effects brought by the technical solutions provided in this application include at least the following.

In this application, the illumination information in the target space is determined and provided for the shading device, and the shading device performs shading processing on the three-dimensional object in the target space by using the illumination information. In this way, for target space, the server may calculate illumination information once, and provide the illumination information for the device that performs shading processing on the target space. Therefore, the shading device may perform shading processing on the target space based on the viewing angle and the observer position that are determined by the shading device and the illumination information provided by the server. In addition, even if the shading device obtains that the viewing angle and/or the observer position change/changes, the illumination information does not need to be re-determined. Therefore, the processing resource of the shading device can be saved.

DESCRIPTION OF EMBODIMENTS

Figure 1:
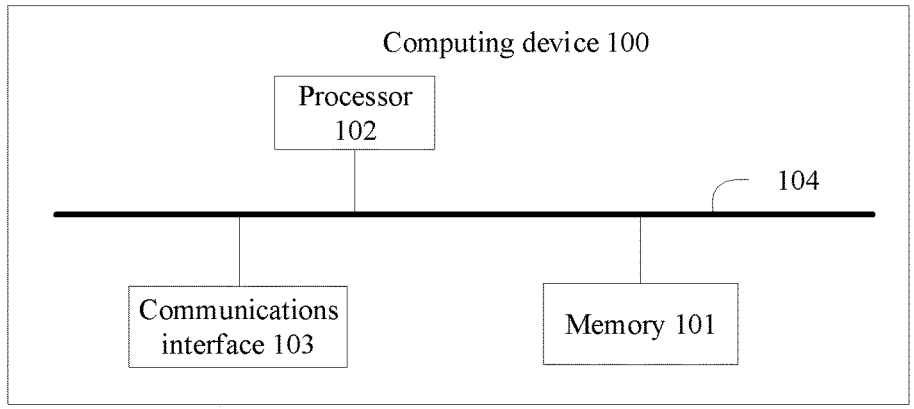
FIG. 1 is a schematic diagram of a structure of a computing device according to an example embodiment of this application.

To make objectives, technical solutions, and advantages of this application clearer, the following further describes implementations of this application in detail with reference to the accompanying drawings.

For ease of understanding of embodiments of this application, the following first describes concepts of terms used.

1. A three-dimensional model (Three Dimensional Model, 3D Model) is a representation of identifiers of polygons and texture mappings of an object, and is usually displayed by using a terminal device.

2. Geometry (Geometry) is a polygon element such as a point, a line, a triangle, and a polygon in a three-dimensional model.

3. A texture (Texture) may also be referred to as a texture mapping, a texture map, or the like, for example, a rough texture mapping, a smooth texture mapping, and a wood texture mapping. In computer graphics, a bitmap stored in a memory is wrapped on a surface of a three-dimensional object.

4. Render (Render) is a process of generating an image by using a three-dimensional model.

5. Shading (Shading) is to shade an object in a rendering process, that is, calculate a pixel value of each pixel in an image based on a direction of the object relative to light and a distance between the object and a light source, where the pixel value determines graphics displayed in the final image and brightness effects.

6. Ray tracing (Ray Tracing) is a special rendering method that tracks light emitted from an eye rather than light from a light source in three-dimensional computer graphics.

In an existing method for shading a three-dimensional object, a light ray collides with a three-dimensional object in three-dimensional space, and then shading processing is performed in screen space. If an observer position and a viewing angle of an observer change, shading processing needs to be recalculated in an entire rendering process, and a calculation amount is large. Therefore, a three-dimensional shading method with a small calculation amount is required.

The three-dimensional shading method in this embodiment of this application may be applied to a plurality of rendering scenarios, for example, a three-dimensional game rendering scenario, and a movie animation production scenario. The three-dimensional game rendering scenario may be a multi-user game sharing scenario. In addition, after a shading result of the three-dimensional object is obtained by using the method, terminals such as a mobile phone, a tablet computer, and augmented reality (Augmented Reality, AR) or virtual reality (Virtual Reality, VR) glasses may display the three-dimensional object based on the shading result.

The three-dimensional shading method provided in this embodiment of this application may be applied to shading processing on a three-dimensional object in three-dimensional space. The three-dimensional shading method may be executed by a three-dimensional shading apparatus (hereinafter referred to as a shading apparatus for short). The shading apparatus may be a hardware apparatus, for example, a computing device of a server type or a terminal type, or may be a software apparatus (for example, may be a set of software programs running on the hardware apparatus). In addition, the shading apparatus may alternatively be a virtual shading device. For example, the shading apparatus is a cloud mobile phone. In this embodiment of this application, an example in which the shading apparatus is a terminal device is used for description.

When the rendering apparatus is a hardware apparatus, an embodiment of this application further provides a three-dimensional shading computing device. FIG. 1 is an example of a possible architecture diagram of a computing device 100.

The computing device 100 includes a memory 101, a processor 102, a communications interface 103, and a bus 104. The memory 101, the processor 102, and the communications interface 103 implement mutual communication connections through the bus 104.

The memory 101 may be a read only memory (Read Only Memory, ROM), a static storage device, a dynamic storage device, or a random access memory (Random Access Memory, RAM). The memory 101 may store a program. When the program stored in the memory 101 is executed by the processor 102, the processor 102 and the communications interface 103 are configured to perform a three-dimensional shading method. The memory 101 may further store a data set. For example, the memory 101 is configured to store one or more layers of illumination information.

The processor 102 may be a general-purpose central processing unit (Central Processing Unit, CPU), a graphics processing unit (graphics processing unit, GPU), or the like.

The communications interface 103 uses a transceiver module, for example, but not limited to a transceiver, to implement communication between the computing device 100 and another device or a communications network. For example, the data set may be obtained by using the communications interface 103.

The bus 104 may include a path for transmitting information between components (for example, the memory 101, the processor 102, and the communications interface 103) of the computing device 100.

Figure 2:
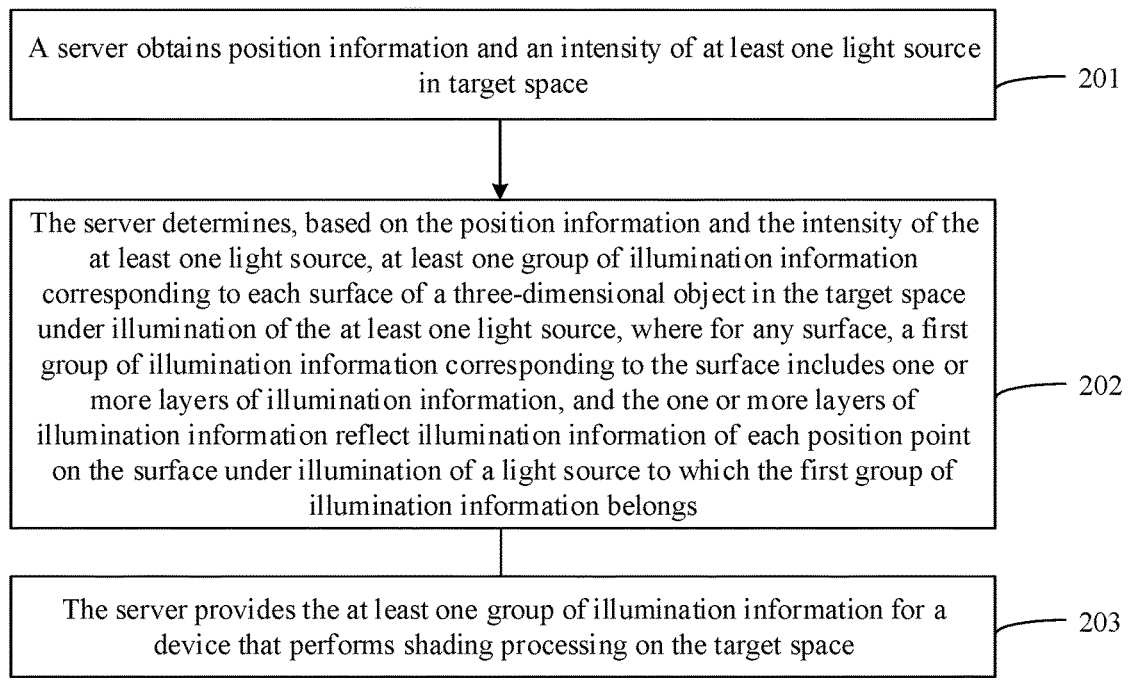
FIG. 2 is a flowchart of a three-dimensional space shading method according to an example embodiment of this application.

The following describes, with reference to FIG. 2, a three-dimensional shading method provided in an embodiment of this application. The method may be performed by a server. As shown in FIG. 2, a processing procedure of the method is as follows:

Step 201: The server obtains position information and an intensity of at least one light source in target space.

The target space is any three-dimensional space to be displayed. In a game scenario, the target space is any scene image or the like. A light source is a light source in the target space. The light source may be any one of a directional light source, a point light source, a linear light source, a surface light source, or a body light source. Light emitted by the light source is light of a preset color. The directional light source simulates light emitted from an infinitely distant source. In this embodiment of this application, an example in which the light source in the target space is the point light source is used for description. In this embodiment of this application, there may be one or more light sources in one target space. For example, in a scenario, as time changes, scenario content does not change, but a quantity of light sources in the scenario changes. In another scenario, an operation of a user changes a quantity of light sources. In another scenario, there is always one light source, but a position of the light source changes as time changes, and it is also considered that the target scenario includes a plurality of light sources. For example, in a scenario, the sun rises and falls in a day, and the sunlight is a light source whose position changes. A more accurate dynamic change can be finally presented to a user by changing a quantity of light sources or a position of the light source. The light source in this embodiment of this application may be a white light source.

In this embodiment, when drawing the target space, a person skilled in the art sets position information and an intensity of at least one light source. The position information of the light source is used to indicate a position of the light source in the target space. The intensity of the light source may be represented by using a color of the light source, or may be represented by using A watts per square meter, where A is a value of the intensity of the light source.

When determining illumination information in the target space, the server may obtain the stored position information and intensity of the at least one light source in the target space.

Step 202: The server determines, based on the position information and the intensity of the at least one light source, at least one group of illumination information corresponding to each surface of a three-dimensional object in the target space under illumination of the at least one light source, where for any surface, a first group of illumination information corresponding to the surface includes one or more layers of illumination information, and the one or more layers of illumination information reflect illumination information of each position point on the surface under illumination of a light source to which the first group of illumination information belongs.

Each three-dimensional object includes a point, a line, a triangle, a polygon, and the like. For example, a cube three-dimensional object includes six quadrilaterals, or includes 12 triangles, and a cylindrical three-dimensional object includes a plurality of triangles. Each three-dimensional object may include a plurality of surfaces. For example, the cube three-dimensional object includes six square surfaces, and the cylindrical three-dimensional object includes two circular surfaces and a plurality of triangular surfaces, that is, a side surface of the cylindrical three-dimensional object includes a plurality of triangles. For any surface, the first group of illumination information corresponding to the surface includes the one or more layers of illumination information, and the one or more layers of illumination information reflect the illumination information of each position point on the surface under illumination of the light source to which the first group of illumination information belongs. The first group of illumination information herein indicates any group of illumination information corresponding to the surface, but does not indicate a specific group of illumination information. Each position point on the surface may also be referred to as each pixel on the surface.

Figure 3:
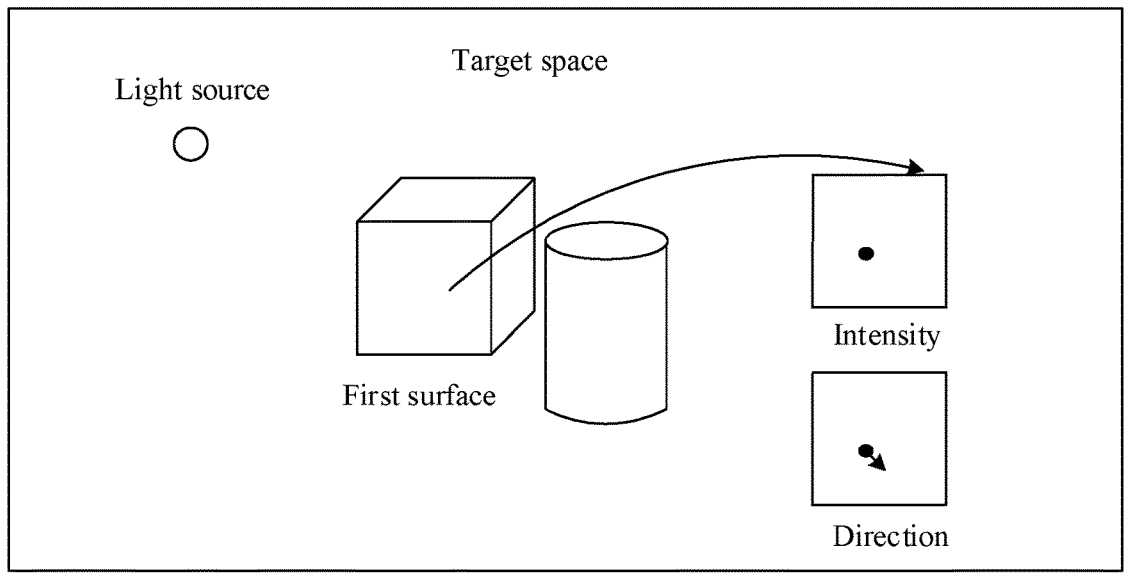
FIG. 3 is a schematic diagram of a layer of illumination information under illumination of a light source according to an example embodiment of this application.
Figure 4:
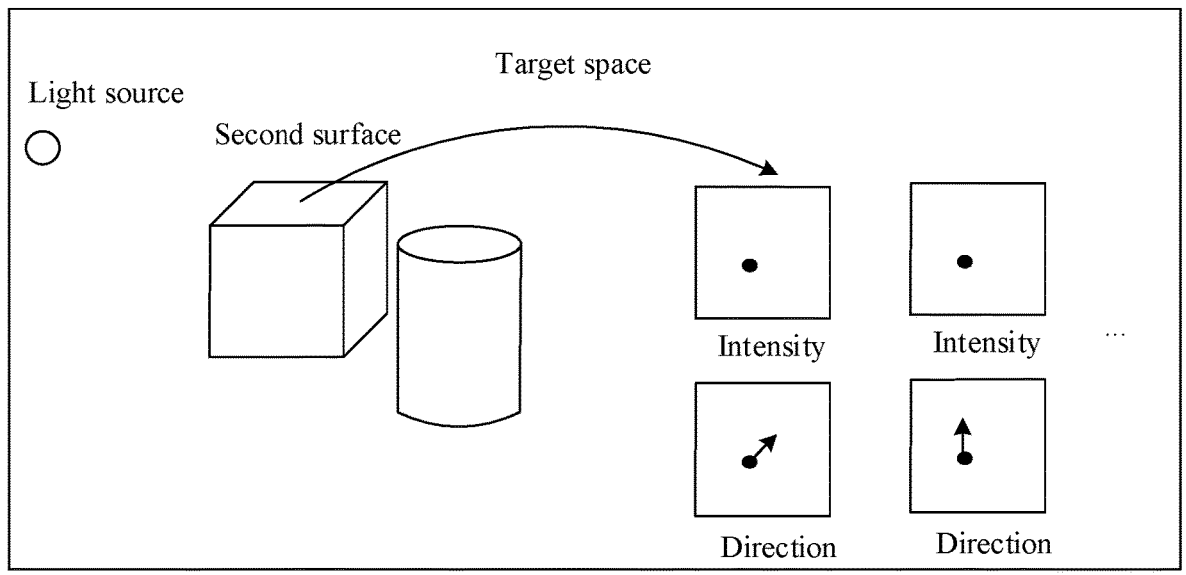
FIG. 4 is a schematic diagram of a plurality of layers of illumination information under illumination of a light source according to an example embodiment of this application.
Figure 5:
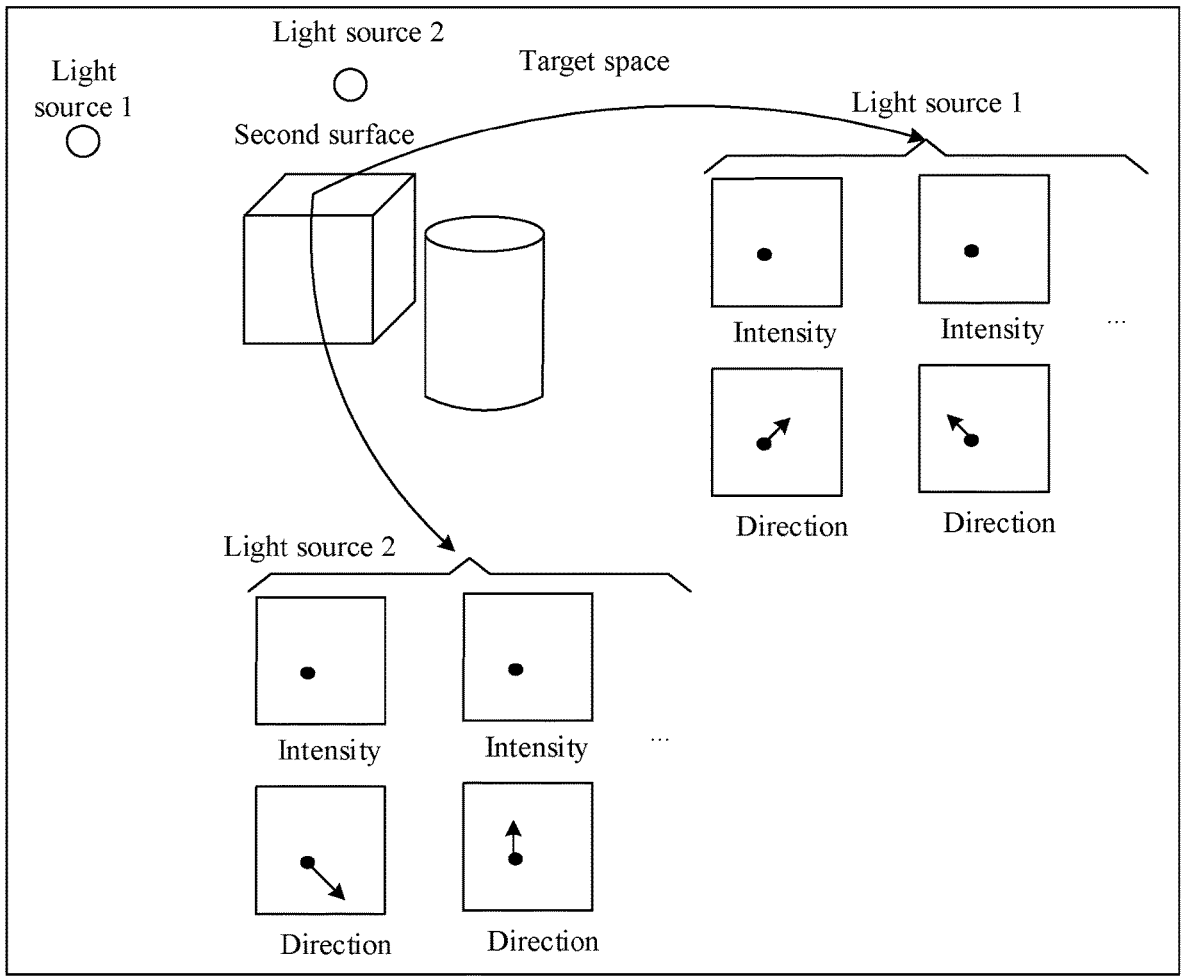
FIG. 5 is a schematic diagram of a plurality of layers of illumination information under illumination of two light sources according to an example embodiment of this application.

In this embodiment, after obtaining the position information and light ray information of the at least one light source, the server may determine, for each light source based on the intensity of the light source, the position information of the light source, and position information of each three-dimensional object in the target space, a group of illumination information corresponding to each surface of each three-dimensional object in the target space under illumination of the light source, that is, obtain a group of illumination information corresponding to each surface of the three-dimensional object in the target space under illumination of the light source. The group of illumination information includes one or more layers of illumination information. For example, in FIG. 3, the at least one light source is one light source, the three-dimensional object is a cube, and a first surface of the cube corresponds to one layer of illumination information. In FIG. 4, the at least one light source is one light source, the three-dimensional object is a cube, and a second surface of the cube corresponds to a plurality of layers of illumination information. In FIG. 5, the at least one light source is two light sources: a light source 1 and a light source 2, and the three-dimensional object is a cube. On a second surface of the cube, under illumination of the light source 1, the second surface corresponds to a group of illumination information, and under illumination of the light source 2, the second surface corresponds to a group of illumination information. The two groups of illumination information each include a plurality of layers of illumination information. In this way, under illumination of any one light source, each surface of the three-dimensional object in the target space corresponds to a group of illumination information.

Figure 6:
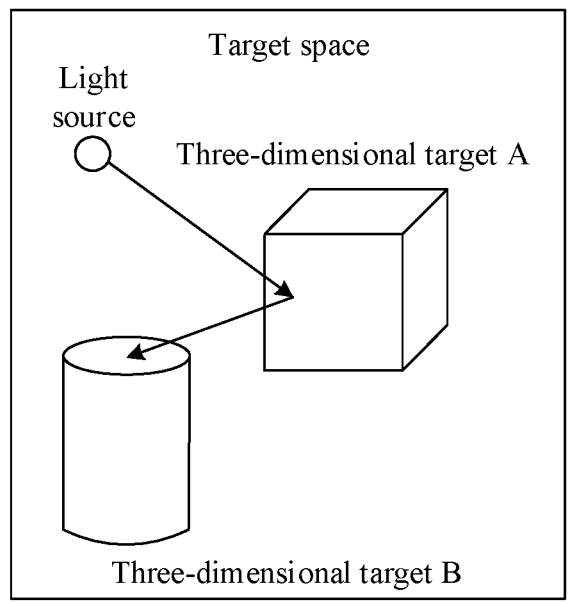
FIG. 6 is a schematic diagram of light bounce according to an example embodiment of this application.

Herein, in a casting algorithm for ray tracing, under illumination of a light source, for a surface of the three-dimensional object, when the surface corresponds to one layer of illumination information, the surface is directly illuminated by the light source only once, or is illuminated by bounce only once; when the surface corresponds to a plurality of layers of illumination information, the surface is directly illuminated by the light source once and is illuminated by bounce once or for a plurality of times, or is not directly illuminated by the light source, but is illuminated by bounce for a plurality of times. "Illuminated by bounce" herein means that a light ray does not directly illuminate the three-dimensional object from a light source, but illuminates the three-dimensional object by reflection of another three-dimensional object. For example, as shown in FIG. 6, the light ray of the light source illuminates a three-dimensional object A, the three-dimensional object A reflects the light ray to a three-dimensional object B, and the light ray illuminates the three-dimensional object B. That is, the light ray illuminates the three-dimensional object B, that is, illuminates the three-dimensional object B by bounce.

Optionally, under illumination of a light source, if a surface of the three-dimensional object corresponds to one layer of illumination information, the layer of illumination information may also be one layer of illumination information obtained after a plurality of layers of illumination information corresponding to the surface are superposed.

Step 203: The server provides the at least one group of illumination information for a device that performs shading processing on the target space.

In different scenarios, devices that perform shading processing on the target space are different. Specifically, in a game sharing scenario, devices that perform shading processing on the target space are terminal devices used by a plurality of users currently playing the game. In a movie animation scenario, devices that perform shading processing on the target space are terminal devices used by a plurality of users currently watching a movie animation, cloud mobile phones used by a plurality of users currently watching the movie animation, or the like.

In this embodiment, the server may determine devices that perform shading processing on the target space, that is, shading devices, and send the at least one group of illumination information in the target space to these devices. For example, in a game sharing scenario, the server may determine that a plurality of terminal devices that log in to a shared game are terminal devices shading the target space, and the server may send illumination information to these terminal devices. In this way, for target space, the server may calculate illumination information once, and send the illumination information to the device that performs shading processing on the target space. Therefore, the shading device may perform shading processing on the target space based on a viewing angle and an observer position determined by the shading device and the illumination information provided by the server. In this way, even if the shading device learns that the viewing angle and/or the observer position change, the illumination information does not need to be re-determined, to save a processing resource of the shading device.

It should be noted herein that, when the shading apparatus is a virtual shading device, after completing shading processing on the target space, the virtual shading device sends a shading result of the target space to a terminal device that displays the target space for display.

In addition, the server may further send other information of each three-dimensional object in the target space to the device that performs shading processing on the target space, where the other information is information used during the shading processing. For example, the other information is material information (the material information includes a texture) of each surface of each three-dimensional object, position information of each three-dimensional object, and geometric information of each three-dimensional object. The material information may include an albedo (Albedo), a metallic (Metallic), a roughness (Roughness), a reflectivity (Reflectance), and the like of each position point on the surface, a normal (Normal, N), an ambient occlusion (Ambient Occlusion, AO) layer, and the like of the surface. The AO layer may be referred to as a shadow layer. When two three-dimensional objects are close to each other, a shadow layer is generated. The geometric information is used to indicate geometry forming the three-dimensional object.

Optionally, the at least one group of illumination information mentioned above may be included in the material information, the server provides the at least one group of illumination information along with the material information for the device that performs shading processing on the target space.

It should be noted that A and/or B described in this embodiment of this application include three cases: A, B, and A and B.

The following describes detailed processing of each step in the procedure in FIG. 2.

In a possible implementation, processing in step 202 may be:

The server obtains light ray information of a light source, where the light ray information includes a quantity of light rays and a light direction. The server determines scattering information of each surface of the three-dimensional object in the target space with a light ray of the at least one light source based on the intensity, the position information, and the light ray information of the at least one light source; and determines, based on the scattering information of each surface of the three-dimensional object, the at least one group of illumination information corresponding to each surface of the three-dimensional object under illumination of the at least one light source.

For a first surface of the three-dimensional object under illumination of any one light source, the first surface is any surface, and scattering information of the first surface includes an intensity, a direction, and a number of bounces of an incident light ray at each position point on the first surface, or includes an intensity, a direction, and a number of bounces of a reflection light ray at each position point on the first surface.

In this embodiment, when drawing the target space, a person skilled in the art sets light ray information of the at least one light source. The light ray information of the light source may include a quantity of light rays, a light intensity, and a light direction of the light source, and the quantity of light rays is a quantity of light rays emitted by the light source, for example, 500 light rays. The light intensity is an intensity of the light ray emitted from the light source. The light direction is an angle at which each light ray is emitted from the light source. The server may obtain stored light ray information. The server determines a group of illumination information corresponding to each surface of the three-dimensional object under illumination of each light source. Specifically, for any one light source, the server may determine scattering information of each surface of each three-dimensional object in the target space with a light ray of the light source based on the position information of the light source, the light ray information of the light source, and the position information of the three-dimensional object in the space. The scattering information may be determined in the following manner:

A process in which the server determines the scattering information by using a ray casting algorithm in ray tracing is as follows: For any surface of the three-dimensional object, the server determines, based on the position information of the three-dimensional object, the light intensity, the position information, and the light direction of the light source, an intensity, a direction, and a source of an incident light ray cast to each position point on the surface. The intensity, the direction, and the source of the incident light ray at each position point on the surface are scattering information corresponding to the surface. The source of the incident light ray records a number of bounces when the incident light ray is bounced on the surface after being emitted from the light source. For example, the light ray directly comes from the light source, and a number of bounces is 0. For another example, the light ray does not directly come from the light source, and when incident to a first surface of a three-dimensional object, the light ray passes a surface A of a first three-dimensional object and a surface B of a second three-dimensional object, that is, a number of bounces is 2. For a three-dimensional object, that the light ray directly comes from the light source means that the light ray emitted by the light source directly illuminates the surface of the three-dimensional object, and that the light ray does not directly come from the light source means that the light ray emitted by the light source illuminates the surface of the three-dimensional object only after reflection and/or diffuse reflection of another three-dimensional object.

Figure 7:
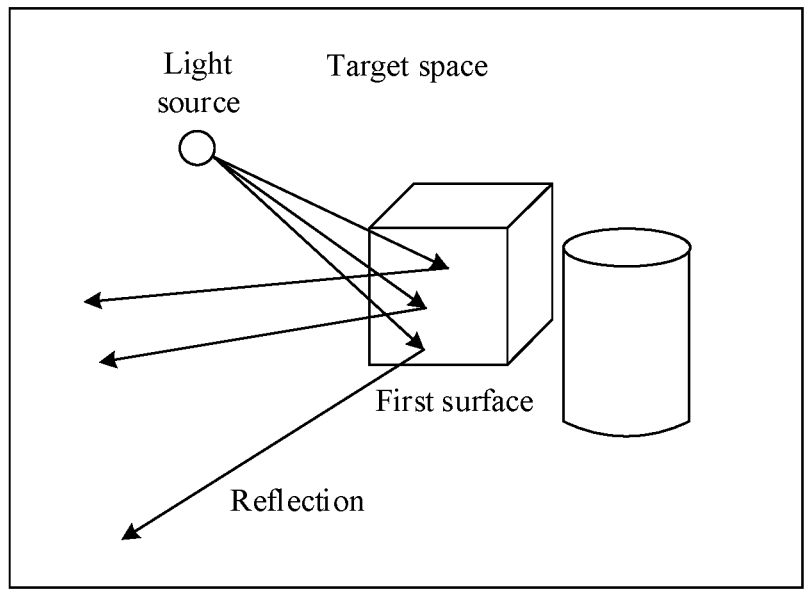
FIG. 7 is a schematic diagram of light reflection according to an example embodiment of this application.

Alternatively, for any surface of the three-dimensional object, the server determines, based on the position information of the three-dimensional object, the light intensity, the position information, and the light direction of the light source, an intensity, a direction, and a source of a reflection light ray cast to each position point on the surface. The intensity, the direction, and the source of the reflection light ray at each position point on the surface are scattering information corresponding to the surface. The source of the reflection light ray records a number of bounces when the reflection light ray bounces on the surface after being emitted from the light source. For example, the light ray directly comes from the light source, and a number of bounces is 0. For another example, the light ray does not directly come from the light source, and when reflected from a first surface of a three-dimensional object, the light ray passes a surface A of a first three-dimensional object and a surface B of a second three-dimensional object, that is, a number of bounces is 2. For a three-dimensional object, that the light ray directly comes from the light source means that the light ray emitted by the light source directly illuminates the surface of the three-dimensional object to form a reflection light ray, and that the light ray does not directly come from the light source means that the light ray emitted by the light source illuminates the surface of the three-dimensional object to form the reflection light ray only after reflection and/or diffuse reflection of another three-dimensional object. FIG. 7 provides a schematic diagram in which a first surface of the three-dimensional object reflects a received light ray emitted by a light source.

Then, the server may determine, by using the scattering information of each surface of each three-dimensional object, at least one group of illumination information corresponding to each surface of each three-dimensional object under illumination of the at least one light source.

It should be noted herein that a manner of determining an intensity of a light ray incident to any surface is as follows: The server may obtain a direction of a light ray reflected from a light source, transmission of the light ray is straight-line transmission, and the server may further obtain position information of each three-dimensional object. In addition, a direction of the light ray after reflection and diffuse reflection may be determined based on a texture mapping of a surface of the three-dimensional object. In this way, a position and a direction of the light ray cast to the three-dimensional object may be determined.

It should be noted herein that a manner of determining an intensity of a light ray incident to any surface is as follows: The intensity of each light ray emitted from the light source is recorded in the intensity of the light source. The light ray of the light source has a preset intensity when emitted from the light source. A transmission distance of the light ray emitted from the light source and incident to the surface may be calculated. The transmission distance is multiplied by a preset attenuation value to obtain a product, and the product is subtracted from the preset intensity of the light ray to obtain the intensity of the incident light ray. Alternatively, the light ray of the light source has a preset intensity when emitted from the light source. A total attenuation amount when the light ray passes all three-dimensional objects may be calculated based on a texture mapping of the three-dimensional object, and the intensity of the incident light ray is obtained by subtracting the total attenuation amount from the preset intensity. Alternatively, the intensity of the incident light ray may be determined by using the two manners. A manner of determining an intensity of a light ray reflected from any surface is the same as a manner of determining an intensity of an incident light ray incident to any surface, and details are not described herein again. Herein, the intensity of each light ray may be represented by a color of the light source, or may be represented by A watts per square meter, where A is a value of the intensity of the light ray.

In a possible implementation, processing of the server determining at least one group of illumination information corresponding to each surface of each three-dimensional object under illumination of at least one light source based on the scattering information of each surface of each three-dimensional object is:

for a first surface of the three-dimensional object in the target space, separately superposing intensities and directions of light rays that have a same number of bounces and that are in scattering information corresponding to the first surface under illumination of a target light source in the at least one light source, to obtain a superposition intensity and superposition direction of a light ray that has each number of bounces and that corresponds to the first surface; and determining, based on the superposition intensity and superposition direction of the light ray that has each number of bounces, a group of illumination information corresponding to the first surface under illumination of the target light source.

The three-dimensional object is any three-dimensional object in the target space, the first surface is any surface of the three-dimensional object, and the target light source is any one light source in the at least one light source in the target space.

In this embodiment, under illumination of the target light source, the scattering information corresponding to the first surface includes a direction and a source of an incident light ray of each position point on the first surface. The server may superpose directions of incident light rays having a same number of bounces at each position point on the first surface, to obtain a direction of the incident light ray at each position point, and superpose intensities of the incident light rays having the same number of bounces at each position point, to obtain a superposition intensity of the incident light ray at each position point. For the first surface, the server determines the superposition intensity and the superposition direction of the incident light ray having each number of bounces as a group of illumination information of the first surface under illumination of the target light source. In the group of illumination information, each layer of illumination information is the superposition intensity and the superposition direction of the incident light ray having each number of bounces.

Alternatively, under illumination of the target light source, the scattering information corresponding to the first surface includes a direction and a source of a reflection light ray at each position point on the first surface. The server may superpose directions of reflection light rays having a same number of bounces at each position point on the first surface, to obtain a superposition direction of the reflection light ray at each position point, and superpose intensities of the reflection light rays having the same number of bounces at each position point, to obtain a superposition intensity of the reflection light ray at each position point. For the first surface, the server determines the superposition intensity and the superposition direction of the reflection light ray having each number of bounces as a group of illumination information of the first surface under illumination of the target light source. In the group of illumination information, each layer of illumination information is the superposition intensity and the superposition direction of the reflection light ray having each number of bounces.

Herein, under illumination of a light source, if the scattering information corresponding to the first surface includes one number of bounces, it indicates that the first surface corresponds to one layer of illumination information; or if the scattering information corresponding to the first surface includes a plurality of numbers of bounces, it indicates that the first surface corresponds to a plurality of layers of illumination information.

Based on the foregoing description, it can be learned that, under illumination of each light source, when illumination information is determined by using a casting algorithm in ray tracing, an intensity and a direction of a light ray in the scattering information corresponding to the first surface under illumination of the target light source are an incident intensity and an incident direction of a light ray incident to the first surface, or an intensity and a direction of a light ray in the scattering information corresponding to the first surface under illumination of the target light source are a reflection intensity and a reflection direction of a light ray reflected from the first surface.

In addition, based on the foregoing description, it can be learned that, when a ray casting algorithm in ray tracing is used, determined illumination layer information is illumination information obtained by direct illumination of the light source and illumination information obtained by illumination by bounce.

It should be noted that, in this embodiment of this application, a transmission speed of a light ray in three-dimensional space is infinite. Therefore, it may be considered that light rays having a same number of bounces are incident to a same position point on a surface at a same time point, that is, may be directly superposed. The foregoing "a same number of bounces" means that a light ray incident to or reflected from a position point on a surface has a same quantity of reflection and/or diffuse reflection times. For example, if a light ray A is emitted from a light source and is directly cast to a surface position point 1, and a light ray B is emitted from a light source and is directly cast to the surface position point 1, a number of bounces of the light ray A is the same as that of the light ray B. For another example, a light ray A is emitted from a light source, is incident to a first three-dimensional object, and arrives at a surface position point 1 after one reflection of the first three-dimensional object. A light ray B is emitted from a light source, is incident to a second three-dimensional object, and arrives at a surface position point 1 after one reflection of the second three-dimensional object. Both the light ray A and the light ray B arrive at the surface position point 1 after one bounce, and therefore, there is a same number of bounces.

It should be further noted herein that, although the more real light ray is obtained when determining the illumination information, the more likely a real three-dimensional object is displayed for the user. However, to save a calculation amount, because human eyes may not sense impact of a light ray bounced for a plurality of times on a displayed three-dimensional object, a maximum number of bounces may be set. For example, the maximum number of bounces is 2, that is, the light source directly illuminates once and is bounced twice.

In a possible implementation, each light source is divided into a plurality of incident ranges based on an incident angle, and a quantity of incident ranges may be set based on an actual requirement. For example, the plurality of incident ranges are four incident ranges, a first incident range is 0 degree to 45 degrees, including 0 degree; a second incident range is 45 degrees to 90 degrees, including 90 degrees; a third incident range is 90 degrees to 135 degrees, including 135 degrees; and a fourth incident range is 135 degrees to 180 degrees, including 180 degrees. In this case, scattering information includes an incident intensity and an incident direction of a light ray, the three-dimensional object under illumination of each light source corresponds to one group of illumination information, and each group of illumination information includes one or more layers of illumination information. Specifically, processing for obtaining each group of illumination information is as follows:

For a target position point on a first surface of the three-dimensional object, the target position point is any position point on the first surface. The server stores an incident range, and determines, in scattering information corresponding to the first surface under illumination of the target light source and based on an incident angle in the incident range, an intensity and a direction of a light ray that belongs to each incident range and that is in light rays incident to the target position point. For example, an incident range is 0 to 45 degrees, and a light ray whose incident angle is 30 degrees belongs to the incident range.

Figure 8:
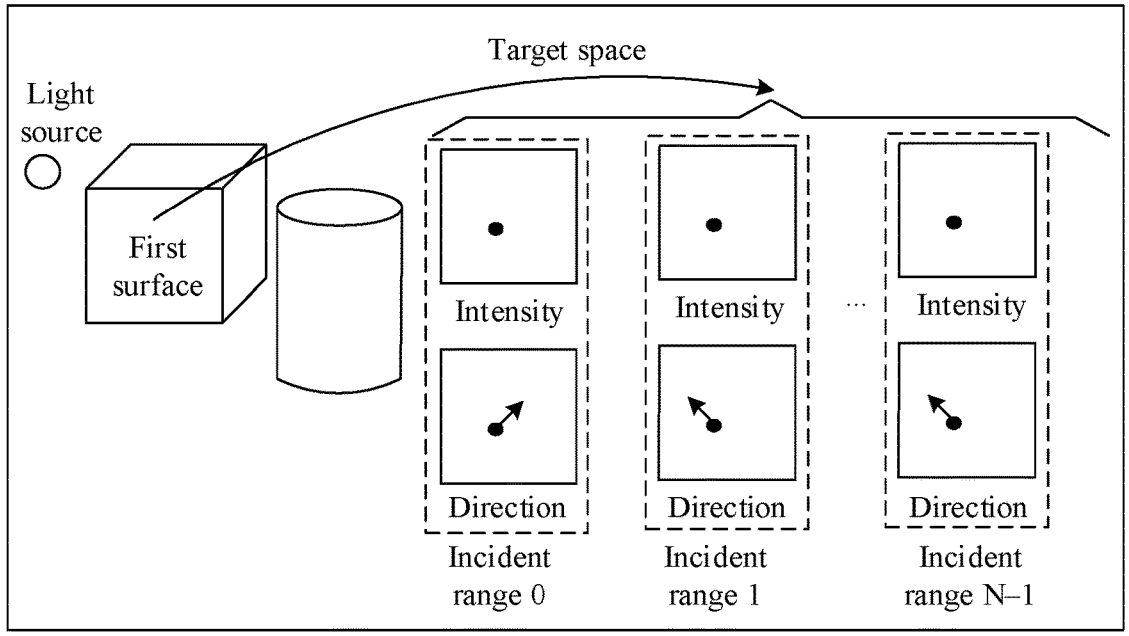
FIG. 8 is a schematic diagram of illumination information of N incident ranges under a light source according to an example embodiment of this application.

For a first incident range in the incident ranges, the server superposes intensities of light rays that belong to the first incident range to obtain a superposition intensity of a light ray at the target position point, and superposes directions of the light rays that belong to the first incident range to obtain a superposition direction of the light ray at the target position point. In this manner, the server obtains the superposition intensity and the superposition direction of the light ray at each position point on the first surface in each incident range. In this way, it is equivalent to that a group of illumination information under illumination of each light source is obtained for the first surface, each group of illumination information includes a plurality of layers of illumination information, and each layer of illumination information is illumination information of one incident range. For example, FIG. 8 shows illumination information of N incident ranges under one light source. In FIG. 8, the three-dimensional object is a cube, a first surface is a surface of the three-dimensional object, and an incident range is N incident ranges, that is, an incident range 0 to an incident range N−1.

Figure 9:
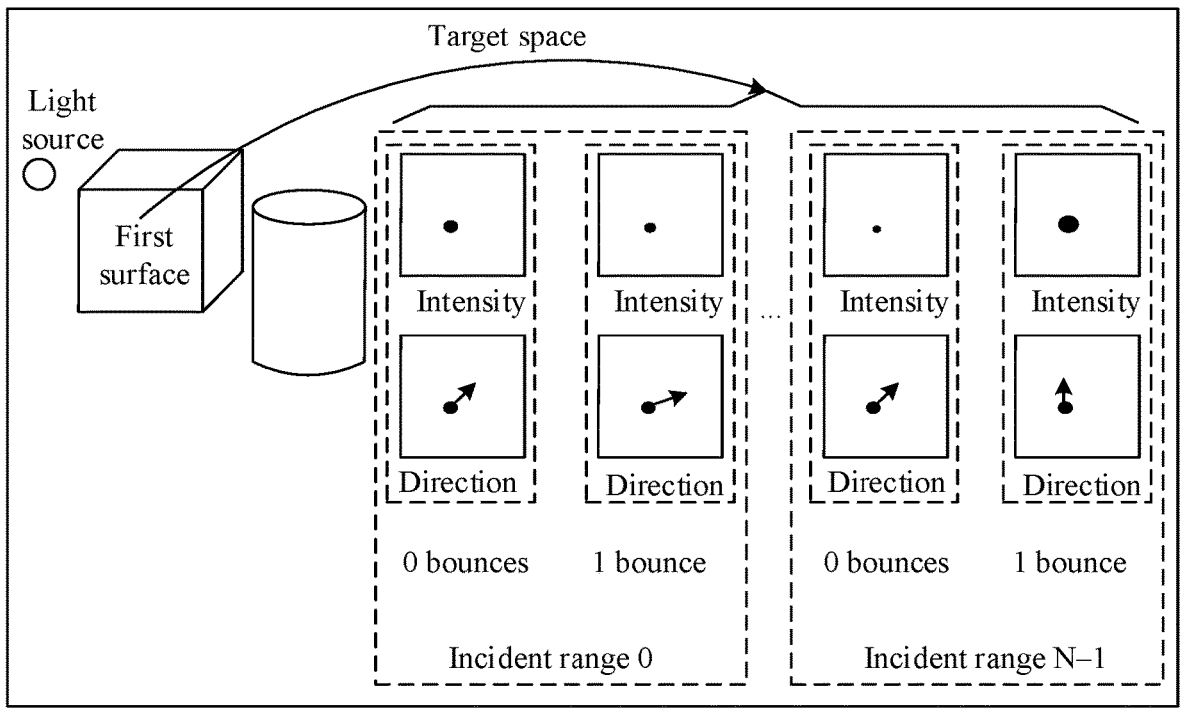
FIG. 9 is a schematic diagram of illumination information of N incident ranges under a light source according to an example embodiment of this application.

Alternatively, for a first incident range in the incident ranges, the server determines an intensity and a direction of a ray of each number of bounces in light rays belonging to the first incident range. The server separately superposes intensities of light rays that have each number of bounces and that belong to the first incident range, to obtain a superposition intensity of a light ray at a target position point for each number of bounces, and separately superposes directions of light rays that have each number of bounces and that belong to the first incident range, to obtain a superposition direction of the light ray at the target position point for each number of bounces. In this manner, the server obtains, in each incident range, the superposition intensity and the superposition direction of the light ray at each position point on the first surface for each number of bounces. In this way, it is equivalent to that a group of illumination information under illumination of each light source is obtained for the first surface, each group of illumination information includes a plurality of layers of illumination information, and each layer of illumination information is illumination information with a same number of bounces and incident range. For example, FIG. 9 shows illumination information of N incident ranges under one light source. In FIG. 9, a three-dimensional object is a cube, a first surface is a surface of the three-dimensional object, and an incident range is N incident ranges, that is, an incident range 0 to an incident range N−1, and each incident range corresponds to two numbers of bounces. In this way, a group of illumination information of the first surface under illumination of each light source includes N*2 layers of illumination information.

In a possible implementation, each light source is divided into a plurality of reflection ranges based on a reflection angle, and a quantity of reflection ranges may be set based on an actual requirement. For example, the plurality of reflection ranges are four reflection ranges, a first reflection range is 0 degree to 45 degrees, including 0 degree; a second reflection range is 45 degrees to 90 degrees, including 90 degrees; a third reflection range is 90 degrees to 135 degrees, including 135 degrees; and a fourth reflection range is 135 degrees to 180 degrees, including 180 degrees. In this case, scattering information includes a reflection intensity and a reflection direction of a light ray, the three-dimensional object under illumination of each light source corresponds to one group of illumination information, and each group of illumination information includes one or more layers of illumination information. Specifically, processing for obtaining each group of illumination information is as follows:

For a target position point on a first surface of the three-dimensional object, the target position point is any position point on the first surface. The server stores a reflection range, and determines, in scattering information corresponding to the first surface under illumination of the target light source and based on a reflection angle in the reflection range, an intensity and a direction of a light ray that belongs to each reflection range and that is in light rays reflected from the target position point.

For a first reflection range in the reflection ranges, the server superposes intensities of light rays that belong to the first reflection range to obtain a superposition intensity of a light ray at the target position point, and superposes directions of the light rays that belong to the first reflection range to obtain a superposition direction of the light ray at the target position point. In this manner, the server obtains the superposition intensity and the superposition direction of the light ray at each position point on the first surface in each reflection range. In this way, it is equivalent to that a group of illumination information under illumination of each light source is obtained for the first surface, each group of illumination information includes a plurality of layers of illumination information, and each layer of illumination information is illumination information of one reflection range.

Alternatively, for a first reflection range in the reflection ranges, the server determines an intensity and a direction of a ray of each number of bounces in light rays belonging to the first reflection range. The server separately superposes intensities of light rays that have each number of bounces and that belong to the first reflection range, to obtain a superposition intensity of a light ray at a target position point for each number of bounces, and separately superposes directions of the light rays that have each number of bounces and that belong to the first reflection range, to obtain a superposition direction of the light ray at the target position point for each number of bounces. In this manner, the server obtains, in each reflection range, the superposition intensity and the superposition direction of the light ray at each position point on the first surface for each number of bounces. In this way, it is equivalent to that a group of illumination information under illumination of each light source is obtained for the first surface, each group of illumination information includes a plurality of layers of illumination information, and each layer of illumination information is illumination information with a same number of bounces and reflection range.

Specifically, intensity superposition and direction superposition of a light ray are described above, and details are not described herein again.

In addition, in a possible implementation, in step 202 in this embodiment of this application, a layer of illumination information corresponding to each surface of each three-dimensional object in the target space may be further determined through Phong lighting (the Phong lighting may be processing in a world coordinate system), and the processing is as follows:

Under illumination of one light source, the server may obtain, by using the Phong lighting, a layer of illumination information corresponding to each surface, that is, a group of illumination information corresponding to each surface includes the layer of illumination information. The layer of illumination information includes an illumination intensity and an illumination direction of each surface of the three-dimensional object. Specifically, the illumination intensity of each position point on each surface is an intensity of the light source. In a world coordinate system, the position information of the light source is a coordinate of the light source. The server may obtain the coordinate of the light source and a coordinate of each position point on each surface, and subtract the coordinate of each position point from the coordinate of the light source to obtain a vector of the light source pointing to the position point. A direction of the vector corresponding to each position point is an illumination direction of each position point. Therefore, the layer of illumination information corresponding to each surface includes the illumination intensity and the illumination direction of each position point on the surface.

It should be noted herein that, in the Phong lighting, an intensity of the light source uses a color of the light source. For example, an intensity of a light source whose red, green, and blue (Red, Green, Blue, RGB) is (255, 255, 255) is greater than that of a light source whose RGB is (128, 128, 128).

Figure 10:
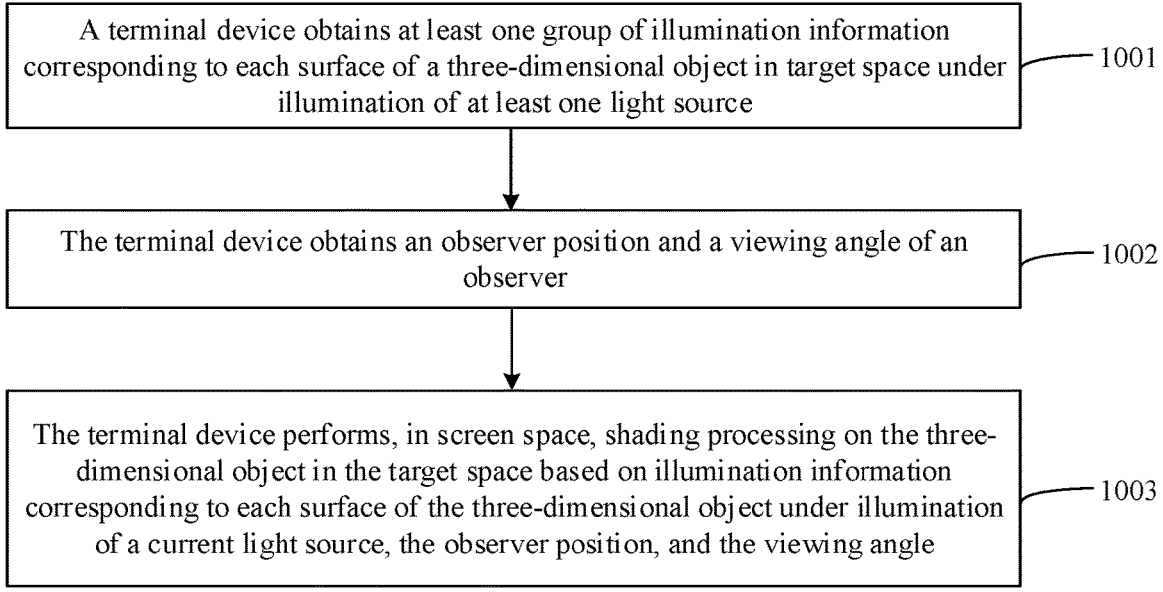
FIG. 10 is a flowchart of a three-dimensional space shading method according to an example embodiment of this application.

In this embodiment of this application, as shown in FIG. 10, a procedure in which a terminal device performs three-dimensional shading in screen space is further provided:

Step 1001: The terminal device obtains at least one group of illumination information corresponding to each surface of a three-dimensional object in target space under illumination of at least one light source, where for any surface, a first group of illumination information corresponding to the surface includes one or more layers of illumination information, and the one or more layers of illumination information reflect illumination information of each position point on the surface under illumination of a light source to which the first group of illumination information belongs.

The terminal device is a device that performs shading processing on the target space, for example, a mobile phone, a tablet, or the like.

In this embodiment, the terminal device may receive the at least one group of illumination information that corresponds to each surface of each three-dimensional object in the target space under illumination of the at least one light source and that is sent by a server, and then store the at least one group of illumination information; or the terminal device determines the at least one group of illumination information corresponding to each surface of each three-dimensional object in the target space under illumination of the at least one light source, and stores the at least one group of illumination information. A determining process is the same as the foregoing process in which the server determines the at least one group of illumination information, and details are not described herein again.

It should be noted herein that a scenario in which the server provides the illumination information may be a scenario in which a plurality of terminal devices perform online sharing, or may be an offline scenario. In a scenario in which the terminal device provides the illumination information, because computing power of the terminal device is generally small, the scenario may be a scenario in which the illumination information is stored offline. Certainly, in the case that the computing power of the terminal device is large enough, processing of determining the illumination information in the online scenario may also be implemented.

Step 1002: The terminal device obtains an observer position and a viewing angle of an observer.

In this embodiment, in different scenarios, the terminal device obtains the observer position of the observer in different manners. For example, in a game scenario, an initial position is preset. An observer (that is, a game player) controls a player by using a game lever to move in target space. The terminal device determines movement information of a current game lever relative to the initial position, and determines a position of a current player, that is, obtains the observer position of the observer. The observer position is a position of the observer in a world coordinate system.

The terminal device may detect a line-of-sight direction of eyes, to obtain the viewing angle of the observer.

Step 1003: The terminal device performs, in the screen space, shading processing on the three-dimensional object in the target space based on illumination information corresponding to each surface of the three-dimensional object in the target space under illumination of a current light source, the observer position, and the viewing angle.

In this embodiment, the terminal device may create a view matrix (View Matrix) based on a position coordinate of the observer position and the viewing angle of the observer. Specifically, the terminal device defines three mutually perpendicular axes (x-axis, y-axis, and z-axis) using the observer as a coordinate origin, defines observation space of the observer by using the three mutually perpendicular axes, and constructs the view matrix by using the three axes and a translation vector. The view matrix may be represented as follows:

$$\begin{bmatrix} Rx & Ry & Rz & 0 \\ Ux & Uy & Uz & 0 \\ Dx & Dy & Dz & 0 \\ 0 & 0 & 0 & 1 \end{bmatrix} \begin{bmatrix} 1 & 0 & 0 & -Px \\ 0 & 1 & 0 & -Py \\ 0 & 0 & 1 & -Pz \\ 0 & 0 & 0 & 1 \end{bmatrix}$$

In the view matrix, (Dx, Dy, Dz) is a vector in a z direction, and is obtained by subtracting a coordinate origin of the world coordinate system from a position coordinate of the observer in the world coordinate system, that is, a vector in a direction of the viewing angle. (Rx, Ry, Rz) is a vector in an x direction, and is obtained by multiplying the vector in the z direction by a predefined upper vector (0, 1, 0). (Ux, Uy, Uz) is a vector in a y direction, and is obtained by multiplying the vector in the z direction by the vector in the x direction. (Px, Py, Pz) is a vector of the observer position.

By using the view matrix, the world coordinate of each three-dimensional object in the target space is transformed into a coordinate relative to the observer position and direction, that is, the position coordinate of each three-dimensional object in an observer coordinate system is obtained.

The terminal device determines a current light source in the target space based on a current display progress of the target space. For example, the server provides the terminal device with a correspondence (set by a producer of the target space) between display time and a light source of the target space, and the terminal device may determine the current light source of the target space based on the correspondence; or the terminal device determines the current light source of the target space based on an operation of a user. For example, when detecting an operation of enabling or disabling a light source by the user, the terminal device determines a change of a light source of the target space, and may further determine the light source of the target space. Alternatively, the terminal device determines the current light source of the target space based on a display scenario. For example, the server provides the terminal device with a correspondence (set by a producer of the target space) between a display scenario and a light source of the target space, and the terminal device may determine the current light source of the target space based on the correspondence.

Figure 11:
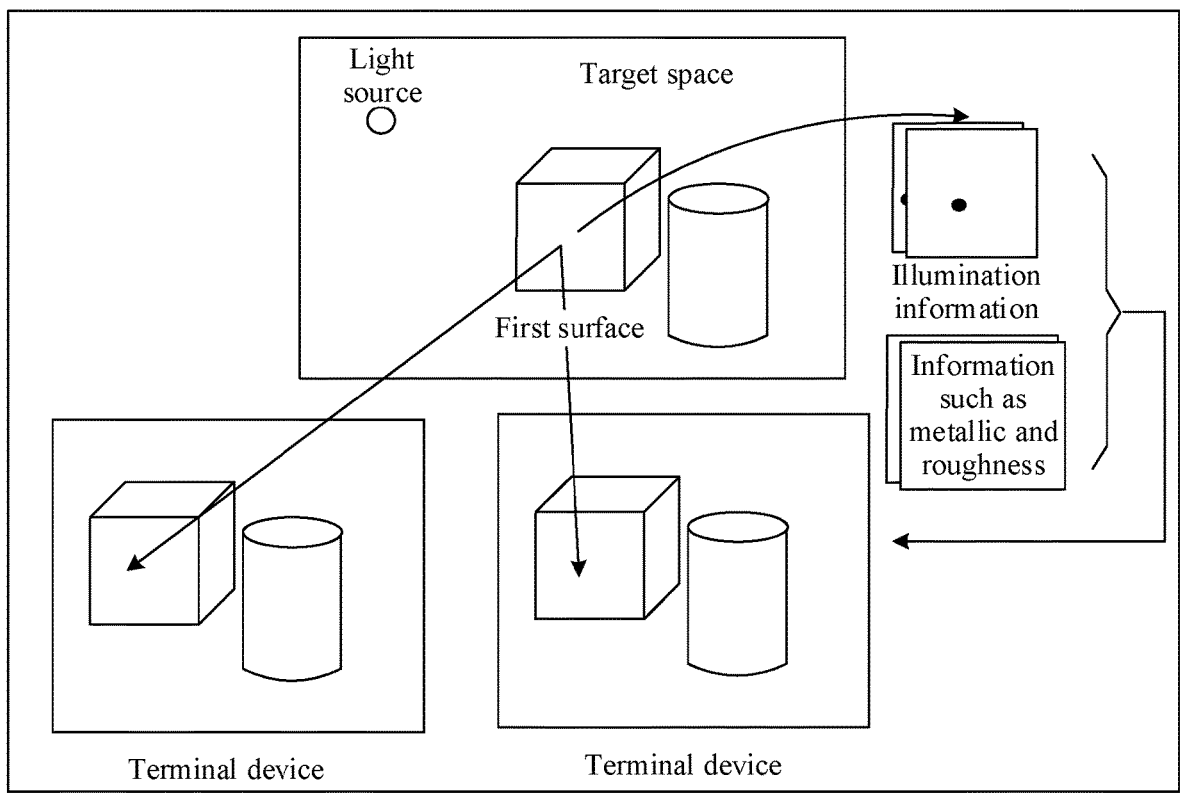
FIG. 11 is a schematic diagram of displaying three-dimensional space by a terminal device according to an example embodiment of this application.

The terminal device may perform shading processing on the three-dimensional object in the target space based on illumination information and material information of each surface of each three-dimensional object under illumination of the current light source, position information of each three-dimensional object, geometric information of each three-dimensional object, and the position coordinate of each three-dimensional object in the observer coordinate system, to obtain a total shading result of each surface of the three-dimensional object, where the total shading result is a pixel value of each position point when the surface is displayed. If the terminal device is a device for displaying the target space, the terminal device may display each three-dimensional object in the target space on a screen by using the total shading result. For example, as shown in FIG. 11, two terminal devices need to display the target space, and an observer position and a viewing angle are different.

In this way, because illumination information of each three-dimensional object in the target space can be obtained, even if the observer position and the viewing angle change, the terminal device may directly re-perform shading processing on the target space based on the illumination information in the target space, and the illumination information does not need to be recalculated in a shading process. Therefore, a processing resource of the terminal device can be saved.

Herein, an example in which the terminal device performs shading processing on the target space and the terminal device performs displaying is used for description. When a virtual shading device performs shading, the virtual shading device performs shading processing on each three-dimensional object in the target space, and then sends a shading result to the terminal device that displays the target space. The terminal device displays the target space based on the shading result.

In addition, in this embodiment of this application, in an online scenario in which the terminal device provides the illumination information, the terminal device may store the illumination information in the target space. After the observer position and the viewing angle of the observer change, the stored illumination information may be directly used for performing shading processing without recalculating the illumination information. Therefore, a processing resource of the terminal device can also be saved.

In step 1003, a processing process in which the terminal device performs shading on each three-dimensional object in the target space is described as follows:

If there are a plurality of the current light sources, under illumination of any one light source of the current light sources, shading processing is separately performed on the three-dimensional object in the target space based on illumination information corresponding to each surface of the three-dimensional object in the target space under illumination of the light source, the observer position, and the viewing angle, to obtain a shading result of each surface of the three-dimensional object in the target space in the screen space under illumination of the light source; and shading results of each surface of the three-dimensional object in the target space in the screen space under illumination of the current light sources are accumulated, to obtain a total shading result of each surface of the three-dimensional object in the target space in the screen space.

In this embodiment, when there are a plurality of the current light sources in the target space, for a three-dimensional object, under illumination of any one light source of the current light sources, the terminal device may separately perform shading processing on each surface of the three-dimensional object by using the illumination information corresponding to each surface of the three-dimensional object under illumination of the light source, the observer position, and the viewing angle, to obtain the shading result of each surface of the three-dimensional object in the screen space under illumination of the light source.

For a surface of the three-dimensional object, the terminal device may add shading results of each position point on the surface under illumination of the current light sources, to obtain a total shading result of each position point on the surface in the screen space.

In a possible implementation, processing of the terminal device obtaining the shading result of each surface of the three-dimensional object in the target space under illumination of each light source is as follows:

Under illumination of any one light source of the current light sources, if a first surface of the three-dimensional object in the target space corresponds to one layer of illumination information, a shading result of the first surface in the screen space under illumination of the light source is obtained based on the layer of illumination information corresponding to the first surface, the observer position, and the viewing angle; or if the first surface of the three-dimensional object in the target space corresponds to a plurality of layers of illumination information, the first surface is separately shaded based on the plurality of layers of illumination information corresponding to the first surface, the observer position, and the viewing angle, to obtain shading results respectively generated by the plurality of layers of illumination information corresponding to the first surface under illumination of the any one light source; and a shading result of the first surface in the screen space under illumination of the any one light source is obtained based on the shading results respectively generated by the plurality of layers of illumination information corresponding to the first surface; or accumulation processing is performed on the plurality of layers of illumination information corresponding to the first surface to obtain accumulated illumination information corresponding to the first surface; and a shading result of the first surface in the screen space under illumination of the any one light source is obtained based on the accumulated illumination information corresponding to the first surface, the observer position, and the viewing angle.

The three-dimensional object is any three-dimensional object in the target space, and the first surface is any surface of the three-dimensional object.

Figure 12:
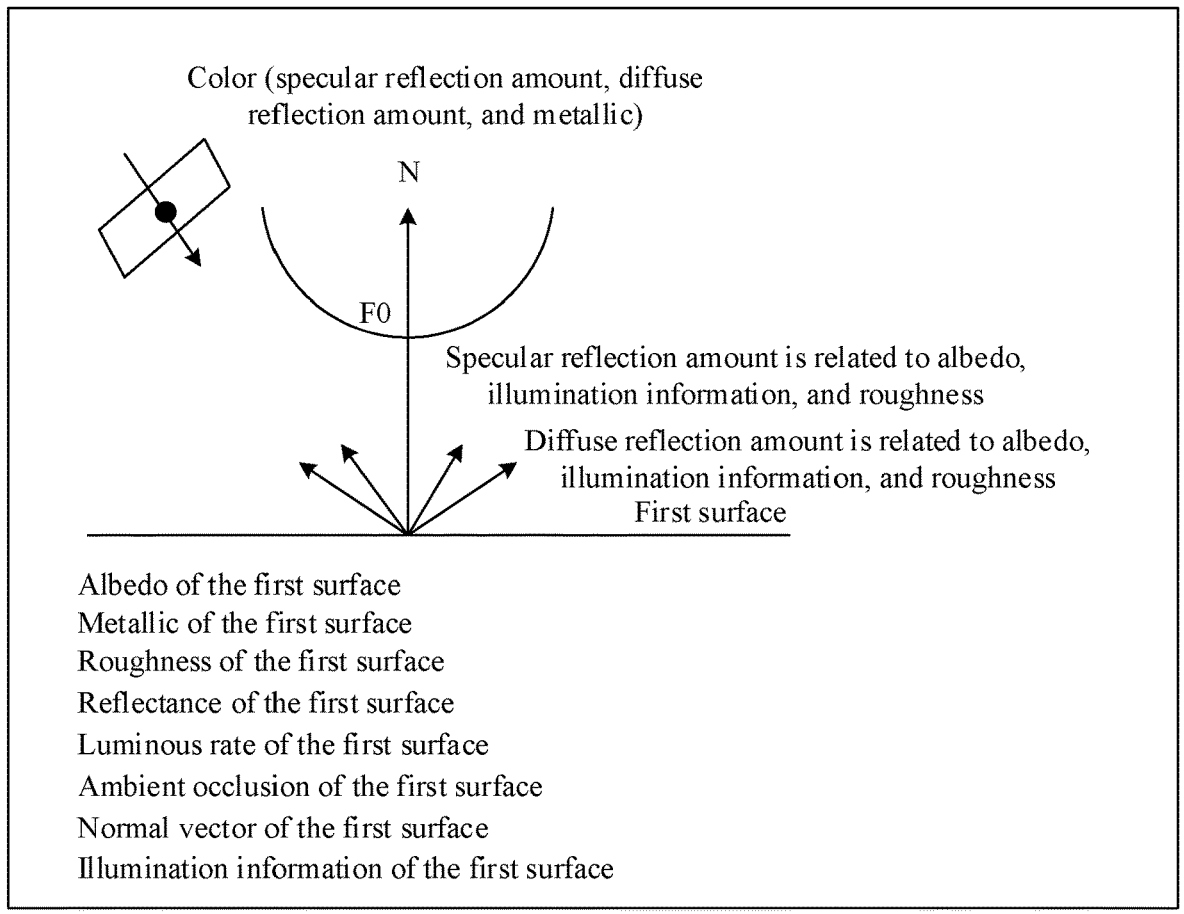
FIG. 12 is a schematic diagram of three-dimensional space rendering according to an example embodiment of this application.

In this embodiment, under illumination of the any one light source of the current light sources, a group of illumination information corresponding to the first surface includes a layer of illumination information. When the first surface corresponds to a layer of illumination information, the terminal device obtains the shading result of the first surface in the screen space based on the layer of illumination information corresponding to the first surface, the observer position, and the viewing angle. Specifically, a processing method for shading in ray tracing is as follows:

As shown in FIG. 12, when determining a shading result of a position point, a terminal device first determines a view matrix by using an observer position, a viewing angle, and the like, then multiplies a coordinate in a world coordinate system by the view matrix, and converts the coordinate into a coordinate in an observer coordinate system (which has been described above and is not described herein again). The terminal device obtains a viewing angle V, where V=position coordinate of eyes of an observer—position coordinate of a first position point on a first surface, and is represented as a vector from the first position point to the observer position. It is assumed that the position coordinate of the eyes of the observer is (1, 1, 1), and the position coordinate of the first position point is (1, 0, 0), V=(1, 1, 1)−(1, 0, 0)=(0, 1, 1). The position coordinates described herein are all represented in the observer coordinate system. V is standardized as a unit vector.

The terminal device reads, from the obtained illumination information, a layer of illumination information corresponding to the first surface under illumination of the any one light source, where the layer of illumination information includes an intensity and a direction of a light ray, and the direction is a direction in the foregoing x-y-z coordinate system. A direction of a light ray at the first position point is represented by M, and M is standardized as a unit vector.

The terminal device obtains an initial value of F0, where F0 is a Fresnel reflectivity at 0 degree (Fresnel Reflectivity at 0 degree), F0 is three-dimensional, and are respectively dimensions in an x direction, a y direction, and a z direction in the observer coordinate system. For example, the initial value of F0 is (0.04, 0.04, 0.04). The terminal device updates F0 based on a metallic and a given albedo of the first position point on the first surface, where updated F0=metallic of the first position point*albedo of the first position point+(1− metallic)*F0, and the albedo of the first position point is represented by R, and B. The metallic is one-dimensional.

The terminal device calculates a specular reflection factor, where the specular reflection factor is related to roughness, F0, an included angle θ between M and V, and the like, and the specular reflection factor is represented by KS, which is specifically:

$$KS = F0 + (\max(vec3(1.0-roughness), F0) - F0) * pow(1.0 - \cos\theta, x) \quad (1)$$

In formula (1), F0 is the updated F0, and the roughness indicates a roughness degree of the first position point. vec3(1.0−roughness) indicates that 1.0−roughness is turned into a three-dimensional vector; max(vec3(1.0−roughness), F0) indicates that a maximum value of vec3(1.0−roughness) and F0 is taken; pow(1.0−cos θ, x) indicates that the power of x of (1.0−cos θ) is calculated, and x is a preset value, for example, 5; cos θ=max(dot(M, V), 0.0), dot(M, V) indicates a dot product of M and V, and max(dot(M, V), 0.0) indicates that a maximum value of dot(M, V) and 0.0 is taken.

The terminal device calculates a diffuse reflection factor, where the diffuse reflection factor is represented by KD, a sum of diffuse reflection and specular reflection is fixed, and when one is more, the other is less. KD is specifically:

$$KD=(1.0-KS)\times(1.0-\text{metallic of the first position point}) \quad (2)$$

In formula (2), because KS is a three-dimensional vector, KD is also a three-dimensional vector.

Next, the terminal device calculates a specular reflection amount and a diffuse reflection amount of the first position point on the first surface:

For the first position point on the first surface, the terminal device determines that the diffuse reflection amount of the first position point is equal to a product of an intensity of a light ray of the first position point on the first surface and a reflectivity of the first position point, where the intensity may be represented by R, and B, and the diffuse reflection amount of the first position point is three-dimensional.

The terminal device determines that the specular reflection amount of the first position point is equal to the specular reflection factor.

The terminal device calculates that a color of the first position point is equal to (diffuse reflection factor*diffuse reflection amount of the first position point+specular reflection amount of the first position point)*value of the first position point at an ambient occlusion layer, and the color of the first position point represents a shading result of the first position point. The terminal device may determine a shading result of another position point on the first surface in a manner of determining the shading result of the first position point. Herein, the color of the first position point is three-dimensional, that is, RGB.

In this description, "*" indicates multiplication.

This is merely a possible implementation. Another shading manner may also be applied to this embodiment of this application. Details are not described herein again.

When the first surface corresponds to a plurality of layers of illumination information, the terminal device performs shading processing in the foregoing manner by using each layer of illumination information, to obtain a shading result corresponding to each layer of illumination information. Then, shading results corresponding to all layers of illumination information of the first surface are added or filtered, to obtain a shading result of the first surface. For example, the first surface corresponds to three layers of illumination information, which are respectively A, B, and C. Shading processing may be respectively performed by using A, B, and C, to obtain three shading results A1, B1, and C1 of the first surface. Then, the terminal device accumulates the three shading results R=A1+B1+C1, to obtain a shading result R of the first surface.

Alternatively, when the first surface corresponds to a plurality of layers of illumination information, the terminal device performs superposition processing on the plurality of layers of illumination information corresponding to the first surface, to obtain one layer of accumulated illumination information. The terminal device performs shading processing or filtering processing in the foregoing manner by using the layer of accumulated illumination information, to obtain a shading result of the first surface. For example, the first surface corresponds to three layers of illumination information, which are respectively A, B, and C. A, B, and C may be superposed to obtain accumulated illumination information R (A, B, and C) of the first surface. Then, the terminal device performs shading processing once by using R (A, B, and C), to obtain a shading result R of the first surface.

The foregoing provides only the shading result of the first surface. A surface of each three-dimensional object is shaded in this manner, so that a shading result of each surface of each three-dimensional object in the target space can be obtained.

The foregoing is a shading process in ray tracing. A shading principle of Phong lighting is similar to a shading process of the ray tracing, and specific processing is as follows (herein also based on any one light source in the current light sources):

The Phong lighting involves ambient lighting, diffuse reflection lighting and specular lighting, and the like. The ambient lighting means that even in the dark, there is still some light in the world, so an object is hardly completely dark. To simulate this, an ambient lighting constant is used to always give the object a color. The diffuse reflection lighting means that a directivity effect of a light source on an object is simulated. The specular lighting means that a bright spot on a surface of a glossy object is simulated.

1. Calculating the Ambient Lighting:

It is assumed that ambient light with at least a preset value directly illuminates all surfaces of a three-dimensional object, and the preset value may be 10%. A color (that is, an intensity of a light source) of the light source in target space is multiplied by the preset value to obtain an ambient light component. Herein, the color of the light source is represented by RGB. That is, an ambient light component of each position point on each surface of the three-dimensional object is a product of the color of the light source and the preset value, and has no direction. Herein, because the color of the light source is represented by RGB, an obtained ambient light component is also represented by RGB. During calculation herein, a value of RGB may correspond to a corresponding value according to a specific formula. The terminal device determines, based on ambient lighting, a shading result of the ambient light for the three-dimensional object. Under the ambient lighting, a first color of a first position point is a result of multiplying an ambient light component of the first position point by an albedo of the first position point. Both the ambient light component and the albedo of the first position point are three-dimensional, and each dimension is correspondingly multiplied. For example, the ambient light component is (3, 3, 1), and the albedo of the first position point is (1, 1, 1), a result of multiplying the two is (3, 3, 1).

2. Calculating the Diffuse Reflection Lighting:

The terminal device obtains a color of the light source, position information of the light source, and the like. The terminal device obtains a normal vector entering a first surface, where for a first position point on the first surface, the first surface is any surface of a three-dimensional object, and the first position point is any position point on the first surface. The terminal device determines that a diffuse reflection component of the first position point=diff*color of the light source, where the color of the light source is represented by RGB, diff=max(dot(first unit vector, second unit vector), 0.0), indicates that diff is a maximum value between a numerical value of a dot product of the first unit vector and the second unit vector and 0.0. The first unit vector is a unit normal vector of the first surface; and the second unit vector is equal to a unit vector in a direction in which the first position point points to a position of the light source. In this way, the diffuse reflection lighting of the first position point can be determined. The diffuse reflection lighting has no direction. The terminal device may determine diffuse reflection lighting of any position point in this manner. Herein, when a value of dot(first unit vector, second unit vector) is less than 0, a value of diff is 0. This indicates that if an included angle between the first unit vector and the second unit vector is greater than 90 degrees, impact of diffuse reflection is 0. The terminal device determines, based on the diffuse reflection lighting, shading of diffuse reflection light for the three-dimensional object. Under the diffuse reflection lighting, a second color of the first position point is a result of multiplying a diffuse reflection light component of the first position point by an albedo of the first position point. Both the diffuse reflection light component and the albedo of the first position point are three-dimensional, and each dimension is correspondingly multiplied.

3. Calculating the Specular Lighting:

For the first position point on the first surface, the terminal device determines a unit vector in a direction of a difference between the position of the light source and the first position point, and the terminal device determines a reflected light component of specular lighting of the first position point, where the reflected light component includes a direction of the reflected light of the specular lighting. The direction of the reflected light of the specular lighting is: a reflection operation (—(a unit vector in a direction in which the first position point points to the position of the light source), (a unit normal vector of the first surface)). Herein, a reflected light component is a reflected light vector obtained by performing a reflection operation on—(a unit vector in a direction in which the first position point points to the position of the light source) based on the unit normal vector of the first surface, —(a unit vector in a direction in which the first position point points to the position of the light source) indicates a unit vector in a direction in which the position of the light source points to the first position point. Because the reflected light leaves an object surface from the first position point, and incident light arrives at the first position point from the light source, a reflection operation needs to be performed in a direction opposite to a normal of the first surface, so that a correct direction of the reflected light can be obtained.

The terminal device determines, based on the specular lighting, shading of the specular reflection light for the three-dimensional object. Under the specular reflection light, a third color of the first position point is a product of a specular intensity of the first position point, a reflection factor, a color of the any one light source, and the albedo of the first position point. The specular intensity reflects an amount of reflected light at the first position point. If the specular intensity is equal to a preset value, the reflection factor is represented by a formula: a formula of the reflection factor is pow(max(dot(viewDir, reflectDir), 0.0), a) (3).

In formula (3), viewDir represents a unit vector in a direction in which the first position point points to an observer position, reflectDir represents a reflected light component of specular lighting of the first position point in illumination information of a specular reflection layer, and is also a unit vector, dot(viewDir, reflectDir) represents a dot product of viewDir and reflectDir, to obtain a cosine value of an included angle between viewDir and reflectDir, max (dot(viewDir, reflectDir), 0.0) represents a maximum value between dot(viewDir, reflectDir) and 0 is taken, and pow (max(dot(viewDir, reflectDir), 0.0), a) indicates that the power of a of max(dot(viewDir, reflectDir), 0.0) is taken, where a is a reflectivity, and is a preset value or is set by target space producer. Generally, a higher reflectivity of an object indicates a stronger capability of reflecting light and less scattering. This processing process is a processing process performed in a world coordinate system. Both a color of the any one light source and the albedo of the first position point are three-dimensional, and each dimension is correspondingly multiplied.

Finally, the terminal device adds the first color, the second color, and the third color to determine a final color of the first position point.

In a possible implementation, as described above, each layer of illumination information of the plurality of layers of illumination information included in the first group of illumination information corresponds to illumination information in different incident ranges or illumination information in different reflection ranges. A processing process in which the terminal device performs shading on each three-dimensional object in the target space in step 1003 is as follows:

For a target position point on the first surface of the three-dimensional object, separately selecting, from a group of illumination information corresponding to the first surface under illumination of each current light source, at least one layer of illumination information closest to a viewing angle corresponding to the target position point; and performing shading processing on the target position point based on the at least one layer of illumination information selected from each group of illumination information, the observer position, and the viewing angle corresponding to the target position point.

In this embodiment, for a target position point on a first surface of a three-dimensional object, before shading is performed, a group of illumination information corresponding to the first surface under illumination of each current light source is obtained. In each group of illumination information, at least one layer of illumination information closest to a viewing angle corresponding to the target position point is selected. The closest herein refers to an endpoint whose viewing angle belongs to a reflection range and/or is located in the reflection range. For example, the first surface is a plane, a viewing angle is 30 degrees, and each layer of illumination information included in each group of illumination information is illumination information in one reflection range. In each group of illumination information, a layer of illumination information whose reflection range is 0 to 45 degrees is separately selected. For another example, the first surface is a plane, a viewing angle is 30 degrees, each layer of illumination information included in each group of illumination information is illumination information having a number of bounces in one reflection range, and there are three numbers of bounces. In each group of illumination information, three layers of illumination information having three numbers of bounces in a reflection range of 0 to 45 degrees are separately selected. For another example, the first surface is a plane, a viewing angle is 45 degrees, and each layer of illumination information included in each group of illumination information is illumination information in one reflection range. In each group of illumination information, two layers of illumination information in reflection ranges of 0 to 45 degrees and 45 degrees to 90 degrees are separately selected.

The terminal device performs shading processing on the target position point by using the at least one layer of illumination information selected from each group of illumination information, the observer position, and the viewing angle corresponding to the target position point. For a specific shading process, refer to a shading process of the first position point. Details are not described herein again.

In this way, illumination information can be dynamically selected, and the three-dimensional object can be dynamically rendered in real time.

It should be noted that, if each layer of illumination information included in the first group of illumination information corresponds to illumination information in different incident ranges, when at least one layer of illumination information closest to the viewing angle corresponding to the target position point is selected, an incident range first needs to be converted into a reflection range. According to the foregoing processing of the reflection range, the at least one layer of illumination information closest to the viewing angle corresponding to the target position point is selected.

It should be further noted that, because of different position points on a same surface, a viewing angle may be different. When each layer of illumination information corresponds to illumination information in different incident ranges, different layers of illumination information may be obtained for different position points on a same surface.

In addition, in this embodiment of this application, a processing process of performing shading based on a reflectivity of a target surface is further provided:

In this embodiment of this application, a process in which a terminal device performs three-dimensional shading in screen space is further provided.

At least one group of illumination information corresponding to each surface of a three-dimensional object in target space under illumination of at least one light source is obtained, where for any surface, a first group of illumination information corresponding to the surface includes one or more layers of illumination information, and the one or more layers of illumination information reflect illumination information of each position point on the surface under illumination of a light source to which the first group of illumination information belongs; illumination information corresponding to each surface of the three-dimensional object under illumination of a current light source is determined in the at least one group of illumination information; and shading processing is performed on the three-dimensional object in the screen space based on the illumination information corresponding to each surface of the three-dimensional object under illumination of the current light source and a reflectivity of each surface.

In this embodiment, the at least one group of illumination information corresponding to each surface of the three-dimensional object under illumination of the at least one light source is obtained. The illumination information corresponding to each surface of the three-dimensional object under illumination of the current light source is determined. For any surface of the three-dimensional object, a reflectivity of the surface is obtained. A value relationship between the reflectivity of the surface and a preset value is determined, and if the reflectivity of the surface is less than the preset value, shading processing is performed on the surface in material space based on the illumination information corresponding to the surface under illumination of the current light source, to obtain a material shading result. For example, for a surface, all layers of illumination information of the surface are superposed, and then shading is performed, or shading is separately performed by using each layer of illumination information of the surface, and shading results corresponding to all layers of illumination information are finally superposed. Then, secondary rendering is performed on the material shading result of the surface, and shading is performed in screen space. Herein, the material space is two-dimensional space, and is generally represented by two coordinate values uv. In addition, a mapping coordinate is corresponded, indicating that a coordinate of the two-dimensional material space in three-dimensional space.

The secondary rendering herein refers to casting the material shading result of the surface to two-dimensional screen space.

If the reflectivity of the surface is greater than or equal to the preset value, the observer position and the viewing angle of the observer are obtained; and shading processing is performed on the surface in the screen space based on the illumination information corresponding to the surface under illumination of the current light source, the observer position, and the viewing angle. For this processing, refer to the foregoing description. Details are not described herein again.

The preset value herein is small. When the reflectivity of the surface is low, it indicates that the position of the observer and the viewing angle of the observer do not affect the shading result. Therefore, the material shading result may be first obtained, and then rendering is performed in the screen space.

In this way, according to this embodiment of this application, power consumption of a terminal device can be saved in a plurality of scenarios requiring rendering. For example, this embodiment of this application is applied to a game rendering scenario, and terminal devices of different users in a same scenario in a shared game all need to be rendered. Therefore, shading needs to be performed, that is, illumination information is calculated. By using the solution in this embodiment of this application, the server provides the illumination information for a terminal device of each user in the shared game. The terminal devices of different users may use the illumination information for performing shading on the scenario based on the observer position and the viewing angle of the user, and the illumination information does not need to be calculated. In addition, the server only needs to calculate the illumination information once, and therefore, a calculation amount of the shading device can be saved. In addition, because the illumination information is obtained by actual calculation, rendering quality of the scenario is not affected.

In addition, in this embodiment of this application, an architecture of baking may be further provided. On an apparatus with limited computing power, illumination information may be processed offline in advance and stored (for example, stored at a material layer). The terminal device may perform shading processing on a scenario based on the illumination information obtained offline in advance, to implement high-quality rendering.

Figure 13:
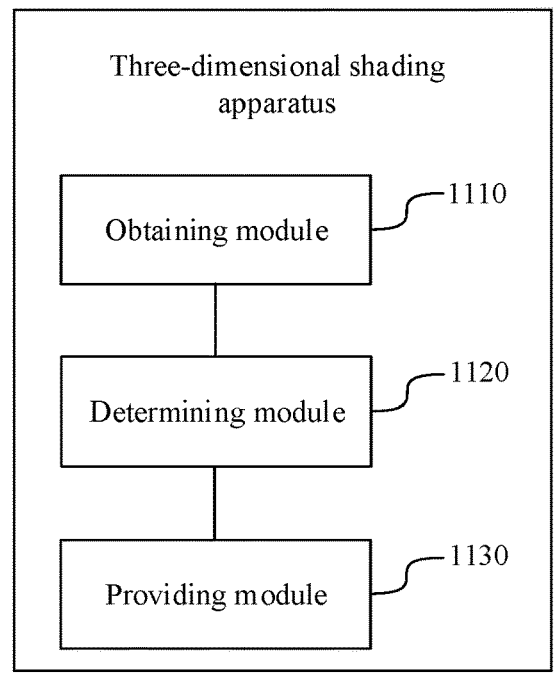
FIG. 13 is a schematic diagram of a structure of a three-dimensional space shading apparatus according to an example embodiment of this application.

FIG. 13 is a structural diagram of a three-dimensional shading apparatus according to an embodiment of this application. The apparatus may be implemented as a part of the apparatus or the entire apparatus by using software, hardware, or a combination thereof. The apparatus provided in this embodiment of this application may implement the procedure described in FIG. 2 in embodiments of this application. The apparatus includes an obtaining module 1110, a determining module 1120, and a providing module 1130.

The obtaining module 1110 is configured to obtain position information and an intensity of at least one light source in target space, and may be specifically configured to implement an obtaining function in step 201 and perform an implicit step included in step 201.

The determining module 1120 is configured to determine, based on the position information and the intensity of the at least one light source, at least one group of illumination information corresponding to each surface of a three-dimensional object in the target space under illumination of the at least one light source, where for any surface, a first group of illumination information corresponding to the surface includes one or more layers of illumination information, and the one or more layers of illumination information reflect illumination information of each position point on the surface under illumination of a light source to which the first group of illumination information belongs, and may be specifically configured to implement a determining function in step 202 and perform an implicit step included in step 202.

The providing module 1130 is configured to provide the at least one group of illumination information for a device that performs shading processing on the target space, and may be specifically configured to implement a providing function in step 203 and perform an implicit step included in step 203.

In a possible implementation, the obtaining module 1110 is further configured to:

obtain light ray information of the light source, where the light ray information includes a quantity of light rays and a light direction.

The determining module 1120 is configured to:

determine scattering information of each surface of the three-dimensional object in the target space with a light ray of the at least one light source based on the intensity, the position information, and the light ray information of the at least one light source; and determine, based on the scattering information of each surface of the three-dimensional object, the at least one group of illumination information corresponding to each surface of the three-dimensional object under illumination of the at least one light source.

In a possible implementation, the determining module 1120 is configured to:

separately superpose, for a first surface of the three-dimensional object in the target space, intensities and directions of light rays that have a same number of bounces and that are in scattering information corresponding to the first surface under illumination of a target light source in the at least one light source, to obtain a superposition intensity and a superposition direction of rays of each number of bounces and corresponding to the first surface; and determine, based on the superposition intensity and the superposition direction of the rays of each number of bounces, a group of illumination information corresponding to the first surface under illumination of the target light source.

In a possible implementation, an intensity and a direction of a light ray in the scattering information corresponding to the first surface under illumination of the target light source are respectively an incident intensity and an incident direction of a light ray incident to the first surface; or an intensity and a direction of a light ray in the scattering information corresponding to the first surface under illumination of the target light source are respectively a reflection intensity and a reflection direction of a light ray reflected from the first surface.

In a possible implementation, the determining module 1120 is configured to:

for a first surface of the three-dimensional object, determine, in scattering information corresponding to the first surface under illumination of a target light source, an intensity and a direction of a light ray that belongs to each incident range and that is in light rays incident to each position point on the first surface; and determine, based on a superposition intensity and a superposition direction of the light ray that is in each incident range and that corresponds to each position point, a group of illumination information corresponding to the first surface under illumination of the target light source; or for a first surface of the three-dimensional object, determine, in scattering information corresponding to the first surface under illumination of a target light source, an intensity and a direction of a light ray that belongs to each reflection range and that is in light rays reflected from each position point on the first surface; and determine, based on a superposition intensity and a superposition direction of the light ray that is in each reflection range and that corresponds to each position point, a group of illumination information corresponding to the first surface under illumination of the target light source.

In this embodiment of this application, division into modules is an example, and is merely logical function division and may be another division manner in actual implementation. In addition, each functional module in embodiments of this application may be integrated into one processor, or may exist alone physically, or two or more modules may be integrated into one module. The integrated module may be implemented in a form of hardware, or may be implemented in a form of a software functional module.

Figure 14:
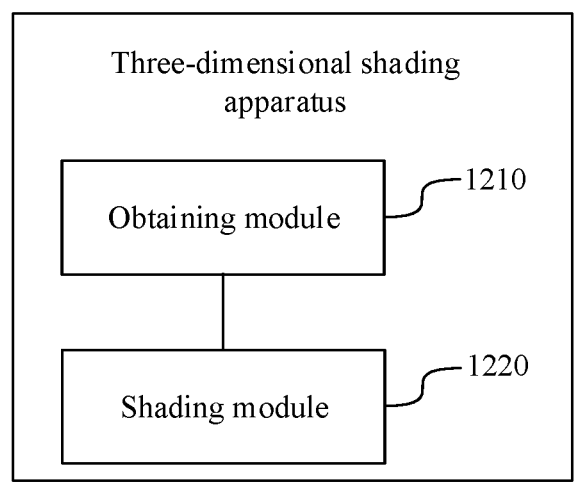
FIG. 14 is a schematic diagram of a structure of a three-dimensional space shading apparatus according to an example embodiment of this application.

FIG. 14 is a structural diagram of a three-dimensional shading apparatus according to an embodiment of this application. The apparatus may be implemented as a part of the apparatus or the entire apparatus by using software, hardware, or a combination thereof. The apparatus provided in this embodiment of this application may implement the procedure described in FIG. 10 in embodiments of this application. The apparatus includes an obtaining module 1210 and a shading module 1220.

The obtaining module 1210 is configured to:

obtain at least one group of illumination information corresponding to each surface of a three-dimensional object in target space under illumination of at least one light source, where for any surface, a first group of illumination information corresponding to the surface includes one or more layers of illumination information, and the one or more layers of illumination information reflect illumination information of each position point on the surface under illumination of a light source to which the first group of illumination information belongs; and obtain an observer position and a viewing angle of an observer, and may be specifically configured to implement an obtaining function in step 801 and step 802 and perform an implicit step included in step 801 and step 802.

The shading module 1220 is configured to perform, in screen space, shading processing on the three-dimensional object in the target space based on illumination information corresponding to each surface of the three-dimensional object in the target space under illumination of a current light source, the observer position, and the viewing angle, and may be specifically configured to implement a shading function in step 803 and perform an implicit step included in step 803.

In a possible implementation, the shading module 1220 is configured to:

if there are a plurality of the current light sources, separately perform, under illumination of any one light source of the current light sources, shading processing on each surface of the three-dimensional object based on illumination information corresponding to each surface of the three-dimensional object under illumination of the light source, the observer position, and the viewing angle, to obtain a shading result of each surface of the three-dimensional object in the screen space under illumination of the light source; and accumulate shading results of each surface of the three-dimensional object in the screen space under illumination of the current light sources, to obtain a total shading result of each surface of the three-dimensional object in the screen space.

In a possible implementation, the shading module 1220 is configured to:

under illumination of any one light source of the current light sources, if a first surface of the three-dimensional object in the target space corresponds to one layer of illumination information, obtain, based on the layer of illumination information corresponding to the first surface, the observer position, and the viewing angle, a shading result of the first surface in the screen space under illumination of the light source; and if the first surface of the three-dimensional object corresponds to a plurality of layers of illumination information, separately shade the first surface based on the plurality of layers of illumination information corresponding to the first surface, the observer position, and the viewing angle, to obtain shading results respectively generated by the plurality of layers of illumination information corresponding to the first surface under illumination of the light source; and obtain a shading result of the first surface in the screen space under illumination of the light source based on the shading results respectively generated by the plurality of layers of illumination information corresponding to the first surface; or perform accumulation processing on the plurality of layers of illumination information corresponding to the first surface to obtain accumulated illumination information corresponding to the first surface; and obtain a shading result of the first surface in the screen space under illumination of the light source based on the accumulated illumination information corresponding to the first surface, the observer position, and the viewing angle.

In a possible implementation, each layer of illumination information of the plurality of layers of illumination information included in the first group of illumination information corresponds to illumination information in different incident ranges or illumination information in different reflection ranges.

The shading module 1220 is configured to:

for a target position point on the first surface of the three-dimensional object, separately select, from a group of illumination information corresponding to the first surface under illumination of each current light source, at least one layer of illumination information closest to a viewing angle corresponding to the target position point; and perform shading processing on the target position point in the screen space based on the at least one layer of illumination information selected from each group of illumination information, the observer position, and the viewing angle corresponding to the target position point.

In a possible implementation, the shading module 1220 is configured to:

perform shading processing on the three-dimensional object in the screen space based on the illumination information corresponding to each surface of the three-dimensional object under illumination of the current light source and a reflectivity of each surface.

In a possible implementation, the obtaining module 1210 is configured to:

receive the at least one group of illumination information that corresponds to each surface of the three-dimensional object in the target space under illumination of the at least one light source and that is sent by a server; or determine the at least one group of illumination information corresponding to each surface of the three-dimensional object in the target space under illumination of the at least one light source.

FIG. 14 is a structural diagram of a three-dimensional shading apparatus according to an embodiment of this application. The apparatus may be implemented as a part of the apparatus or the entire apparatus by using software, hardware, or a combination thereof. The apparatus provided in this embodiment of this application may implement a shading procedure in this embodiment of this application. The apparatus includes an obtaining module 1210 and a shading module 1220.

The obtaining module 1210 is configured to obtain at least one group of illumination information corresponding to each surface of a three-dimensional object in target space under illumination of at least one light source, where for any surface, a first group of illumination information corresponding to the surface includes one or more layers of illumination information, and the one or more layers of illumination information reflect illumination information of each position point on the surface under illumination of a light source to which the first group of illumination information belongs.

The shading module 1220 is configured to:

determine, in the at least one group of illumination information, illumination information corresponding to each surface of the three-dimensional object under illumination of a current light source; and perform shading processing on the three-dimensional object in screen space based on the illumination information corresponding to each surface of the three-dimensional object under illumination of the current light source and a reflectivity of each surface.

In this embodiment of this application, division into modules is an example, and is merely logical function division and may be another division manner in actual implementation. In addition, each functional module in embodiments of this application may be integrated into one processor, or may exist alone physically, or two or more modules may be integrated into one module. The integrated module may be implemented in a form of hardware, or may be implemented in a form of a software functional module.

All or a part of the foregoing embodiments may be implemented by software, hardware, firmware, or any combination thereof. When the software is used for implementation, all or a part of the foregoing embodiments may be implemented in a form of a computer program product. The computer program product includes one or more computer instructions. When the computer program instructions are loaded and executed on a server or a terminal, all or some of the procedures or functions according to embodiments of this application are generated. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial optical cable, an optical fiber, or a digital subscriber line) or wireless (for example, infrared, radio, or microwave) manner. The computer-readable storage medium may be any usable medium accessible to a server or a terminal, or a data storage device, such as a server or a data center, integrating one or more usable media. The usable media may be a magnetic medium (for example, a floppy disk, a hard disk drive, or a magnetic tape), an optical medium (for example, a digital video disk (Digital Video Disk, DVD)), or a semiconductor medium (for example, a solid-state drive).

The invention claimed is:

1. A three-dimensional shading method, comprising:
   obtaining position information and intensity of a light source in a target space;
   obtaining light ray information of the light source, wherein the light ray information comprises information regarding a quantity of light rays and a light direction;
   determining, based on the position information and the intensity of the light source and the quantity of light rays, a group of illumination information data corresponding to each surface of multiple surfaces of a three-dimensional object in the target space under illumination of the light source, wherein the group of illumination information data corresponding to said each surface comprises layers of illumination information data reflecting illumination information of each position point on said each surface under illumination of the light source, wherein step of the determining the group of illustration information data corresponding to each surface comprises:
      determining scattering information of each of the multiple surfaces of the three-dimensional object in the target space with a light ray of the light source based on the intensity, the position information, and the light ray information of the light source; and
      determining, based on the scattering information of the multiple surfaces of the three-dimensional object, the group of illumination information data corresponding to said each surface of the three-dimensional object under illumination of the light source; and
   providing the groups of illumination information data corresponding to the multiple surfaces of the three-dimensional object to a device that performs shading processing on the target space.

2. The method according to claim 1, wherein the step of determining based on the scattering information comprises:
   separately superposing, for a first surface of the three-dimensional object in the target space, intensities and directions of light rays that have a same number of bounces and are in the scattering information corresponding to the first surface under illumination of a target light source in the light source, to obtain a superposition intensity and a superposition direction of rays of each number of bounces and corresponding to the first surface; and
   determining, based on the superposition intensity and the superposition direction of the rays of each number of bounces, the group of illumination information data corresponding to the first surface under illumination of the target light source.

3. The method according to claim 2, wherein an intensity and a direction of a light ray in the scattering information corresponding to the first surface under illumination of the target light source are respectively an incident intensity and an incident direction of a light ray incident to the first surface, or
   an intensity and a direction of a light ray in the scattering information corresponding to the first surface under illumination of the target light source are respectively a reflection intensity and a reflection direction of a light ray reflected from the first surface.

4. The method according to claim 1, wherein the step of determining based on the scattering information comprises:
   for a first surface of the three-dimensional object, determining, in scattering information corresponding to the first surface under illumination of a target light source, an intensity and a direction of a light ray that belongs to each incident range and is in light rays incident to each position point; and determining, based on a superposition intensity and a superposition direction of the light ray that is in each incident range and that corresponds to each position point, a group of illumination information data corresponding to the first surface under illumination of the target light source.

5. The method according to claim 1, wherein the step of determining based on the scattering information comprises:
   for a first surface of the three-dimensional object, determining, in scattering information corresponding to the first surface under illumination of a target light source, an intensity and a direction of a light ray that belongs to each reflection range and that is in light rays reflected from each position point; and determining, based on a superposition intensity and a superposition direction of the light ray that is in each reflection range and that corresponds to each position point, the group of illumination information data corresponding to the first surface under illumination of the target light source.

6. A three-dimensional shading apparatus comprising:
   at least one processor; and
   one or more memories coupled to the at least one processor and storing programming instructions for execution by the at least one processor to cause the three-dimensional shading apparatus to:
   obtain position information and intensity of a light source in target space;
   obtain light ray information of the light source, wherein the light ray information comprises information regarding a quantity of light rays and a light direction;
   determine, based on the position information and the intensity of the light source and the quantity of light rays, a group of illumination information data corresponding to each surface of multiple surfaces of a three-dimensional object in the target space under illumination of the light source, wherein the group of illumination information data corresponding to said each surface comprises layers of illumination information data reflecting illumination information of each position point on said each surface under illumination of the light source, wherein step of the determining the group of illustration information data corresponding to each surface comprises:
      determining scattering information of each of the multiple surfaces of the three-dimensional object in the target space with a light ray of the light source based on the intensity, the position information, and the light ray information of the light source; and
      determining, based on the scattering information of the multiple surfaces of the three-dimensional object, the group of illumination information data corresponding to said each surface of the three-dimensional object under illumination of the light source; and provide the groups of illumination information data for the multiple surfaces of the three-dimensional object to a device that performs shading processing on the target space.

7. The apparatus according to claim 6, wherein the programming instructions, when executed by the at least one processor, cause the apparatus to:

separately superpose, for a first surface of the three-dimensional object in the target space, intensities and directions of light rays that have a same number of bounces and that are in scattering information corresponding to the first surface under illumination of a target light source in the light source, to obtain a superposition intensity and a superposition direction of a ray of each number of bounces and corresponding to the first surface; and determine, based on the superposition intensity and the superposition direction of the rays with each number of bounces, a group of illumination information data corresponding to the first surface under illumination of the target light source.

8. The apparatus according to claim 7, wherein an intensity and a direction of a light ray in the scattering information corresponding to the first surface under illumination of the target light source are respectively an incident intensity and an incident direction of a light ray incident to the first surface; or an intensity and a direction of a light ray in the scattering information corresponding to the first surface under illumination of the target light source are respectively a reflection intensity and a reflection direction of a light ray reflected from the first surface.

9. The apparatus according to claim 6, wherein the programming instructions, when executed by the at least one processor, cause the apparatus to:

for a first surface of the three-dimensional object, determine, in scattering information corresponding to the first surface under illumination of a target light source, an intensity and a direction of a light ray that belongs to each incident range and that is in light rays incident to each position point; and determine, based on a superposition intensity and a superposition direction of the light ray that is in each incident range and that corresponds to each position point on the first surface, a group of illumination information data corresponding to the first surface under illumination of the target light source.

10. The apparatus according to claim 3, wherein the programming instructions, when executed by the at least one processor, cause the apparatus to:

for a first surface of the three-dimensional object, determine, in scattering information corresponding to the first surface under illumination of a target light source, an intensity and a direction of a light ray that belongs to each reflection range and that is in light rays reflected from each position point; and determining, based on a superposition intensity and a superposition direction of the light ray that is in each reflection range and that corresponds to each position point on the first surface, a group of illumination information data corresponding to the first surface under illumination of the target light source.

11. One or more non-transitory computer-readable media storing computer instructions, that when executed by one or more processors, cause a computing device to perform operations comprising:

obtaining position information and intensity of a light source in a target space;

obtaining light ray information of the light source, wherein the light ray information comprises information regarding a quantity of light rays and a light direction;

determining, based on the position information and the intensity of the light source and the quantity of light rays, a group of illumination information data corresponding to each surface of multiple surfaces of a three-dimensional object in the target space under illumination of the light source, wherein the group of illumination information data corresponding to said each surface comprises layers of illumination information data reflecting illumination information of each position point on said each surface under illumination of the light source, wherein step of the determining the group of illustration information data corresponding to each surface comprises:

determining scattering information of each of the multiple surfaces of the three-dimensional object in the target space with a light ray of the light source based on the intensity, the position information, and the light ray information of the light source; and determining, based on the scattering information of the multiple surfaces of the three-dimensional object, the group of illumination information data corresponding to said each surface of the three-dimensional object under illumination of the light source; and providing the groups of illumination information data corresponding to the multiple surfaces of the three-dimensional object to a device that performs shading processing on the target space.

12. The one or more non-transitory computer-readable media according to claim 11, wherein the step of determining based on the scattering information comprises:

separately superposing, for a first surface of the three-dimensional object in the target space, intensities and directions of light rays that have a same number of bounces and are in the scattering information corresponding to the first surface under illumination of a target light source in the light source, to obtain a superposition intensity and a superposition direction of rays of each number of bounces and corresponding to the first surface; and determining, based on the superposition intensity and the superposition direction of the rays of each number of bounces, the group of illumination information data corresponding to the first surface under illumination of the target light source.

13. The one or more non-transitory computer-readable media according to claim 12, wherein an intensity and a direction of a light ray in the scattering information corresponding to the first surface under illumination of the target light source are respectively an incident intensity and an incident direction of a light ray incident to the first surface, or an intensity and a direction of a light ray in the scattering information corresponding to the first surface under illumination of the target light source are respectively a reflection intensity and a reflection direction of a light ray reflected from the first surface.

14. The one or more non-transitory computer-readable media according to claim 11, wherein the step of determining based on the scattering information comprises:

for a first surface of the three-dimensional object, determining, in scattering information corresponding to the first surface under illumination of a target light source, an intensity and a direction of a light ray that belongs to each incident range and is in light rays incident to each position point; and determining, based on a superposition intensity and a superposition direction of the light ray that is in each incident range and that corresponds to each position point, a group of illumination information data corresponding to the first surface under illumination of the target light source.

15. The one or more non-transitory computer-readable media according to claim 11, wherein the step of determining based on the scattering information comprises:

for a first surface of the three-dimensional object, determining, in scattering information corresponding to the first surface under illumination of a target light source, an intensity and a direction of a light ray that belongs to each reflection range and that is in light rays reflected from each position point; and determining, based on a superposition intensity and a superposition direction of the light ray that is in each reflection range and that corresponds to each position point, the group of illumination information data corresponding to the first surface under illumination of the target light source.

* * * * *